(12) United States Patent
Imanaka

(10) Patent No.: US 11,095,209 B2
(45) Date of Patent: Aug. 17, 2021

(54) POWER SUPPLY CONTROL CIRCUIT, POWER SUPPLY DEVICE AND ELECTRONIC APPARATUS

(71) Applicant: ROHM CO., LTD., Kyoto (JP)

(72) Inventor: Yoshinori Imanaka, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/731,216

(22) Filed: Dec. 31, 2019

(65) Prior Publication Data

US 2020/0136501 A1 Apr. 30, 2020

Related U.S. Application Data

(63) Continuation of application No. 14/548,856, filed on Nov. 20, 2014, now Pat. No. 10,651,727.

(30) Foreign Application Priority Data

Nov. 22, 2013 (JP) .............................. JP2013-241521

(51) Int. Cl.
*H02M 1/42* (2007.01)

(52) U.S. Cl.
CPC ................................ *H02M 1/4241* (2013.01)

(58) Field of Classification Search
CPC ......... H02M 3/33507; H02M 3/33523; H02M 3/335; H02M 3/33515; H02M 3/1563;
(Continued)

(56) References Cited

U.S. PATENT DOCUMENTS 7,898,823 B2    3/2011  Wu
8,098,502 B2    1/2012  Mao et al.
(Continued)

FOREIGN PATENT DOCUMENTS

JP    2007104759 A    4/2007
JP    2007110878 A    4/2007
(Continued)

OTHER PUBLICATIONS

USPTO Final Office Action corresponding to U.S. Appl. No. 14/548,856, dated Jun. 13, 2019.
(Continued)

*Primary Examiner* — Fred E Finch, III
(74) *Attorney, Agent, or Firm* — Cantor Colburn LLP

(57) ABSTRACT

The present invention provides a power control circuit and a power device using the power control circuit, wherein quasi resonance is performed by the power control circuit using a coil, current flowing in the coil is monitored by a simple configuration, and a zero cross point or a bottom in resonance is detected. The present invention provides a power control circuit and a power device using the power control circuit. The power control circuit includes a detection circuit connected to a drain of MOSFET, the MOSFET serially connected between an inductor connected to an alternating-current wire and a current sensing resistor connected to ground potential; and a quasi resonance control circuit connected to the detection circuit and the MOSFET for performing quasi resonance control to inductor-current at a zero cross point or a bottom point in a time sequence of discharging while conducting the inductor-current of the inductor.

24 Claims, 17 Drawing Sheets

(58) Field of Classification Search
CPC ........... H02M 3/3385; H02M 3/33561; H02M 3/33592; H02M 3/156; H02M 3/157; H02M 3/1584; H02M 3/33569; H02M 7/066; H02M 7/06; H02M 7/493; H02M 7/53871; H02M 7/219; H02M 7/12; H02M 7/217; H02M 7/068; H02M 7/10; H02M 1/4258; H02M 1/4208; H02M 1/4225; H02M 1/4241; H02M 2001/0032; H02M 2007/4815; H02M 5/4585; Y02B 70/10

See application file for complete search history.

(56) References Cited

U.S. PATENT DOCUMENTS

| | | | |
|---|---|---|---|
| 2005/0219776 | A1 | 10/2005 | Yamashita |
| 2007/0103943 | A1 | 5/2007 | Mangtani et al. |
| 2007/0159857 | A1 | 7/2007 | Lee |
| 2009/0296437 | A1* | 12/2009 | Li .................... H02M 3/33507 363/89 |
| 2011/0149613 | A1* | 6/2011 | Lanni ................. H02M 1/4258 363/21.12 |
| 2012/0250362 | A1 | 10/2012 | Chen |
| 2013/0051088 | A1* | 2/2013 | Yamashita ............. H02M 1/36 363/21.13 |
| 2014/0016363 | A1 | 1/2014 | Chen |
| 2014/0077724 | A1 | 3/2014 | Sawada |
| 2014/0177286 | A1 | 6/2014 | Sonobe |
| 2014/0268918 | A1 | 9/2014 | Gong |
| 2016/0181918 | A1* | 6/2016 | Herfurth .......... H03K 17/04106 315/291 |
| 2016/0291682 | A1* | 10/2016 | Herfurth ............. H02M 3/1582 |
| 2017/0288554 | A1* | 10/2017 | Fahlenkamp ........... H02M 1/08 |

FOREIGN PATENT DOCUMENTS

| | | |
|---|---|---|
| JP | 2009527215 A | 7/2009 |
| JP | 2010045939 A | 2/2010 |
| WO | 0118946 A1 | 3/2001 |
| WO | 2011122314 A1 | 10/2011 |

OTHER PUBLICATIONS

USPTO Final Office Action corresponding to U.S. Appl. No. 14/548,856; dated May 3, 2018.

USPTO Non-Final Office Action corresponding to U.S. Appl. No. 14/548,856; dated Jan. 13, 2017.

USPTO Non-Final Office Action corresponding to U.S. Appl. No. 14/548,856; dated Jul. 27, 2017.

USPTO Non-Final Office Action corresponding to U.S. Appl. No. 14/548,856; dated Nov. 16, 2018.

SIPO First Office Action corresponding to Application No. 201410504870.2; dated Jan. 30, 2018.

* cited by examiner

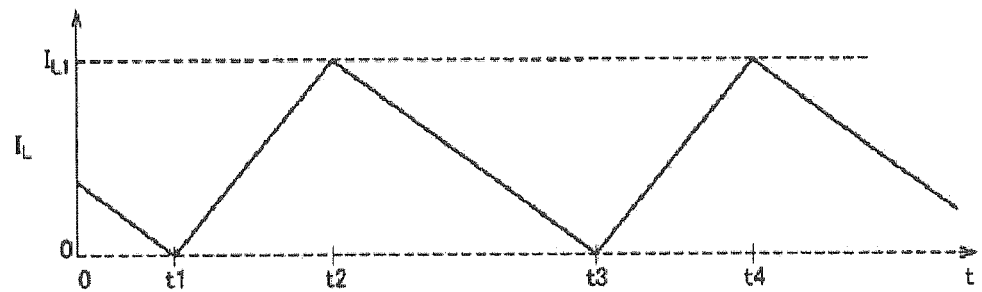
FIG. 9A
FIG. 9B
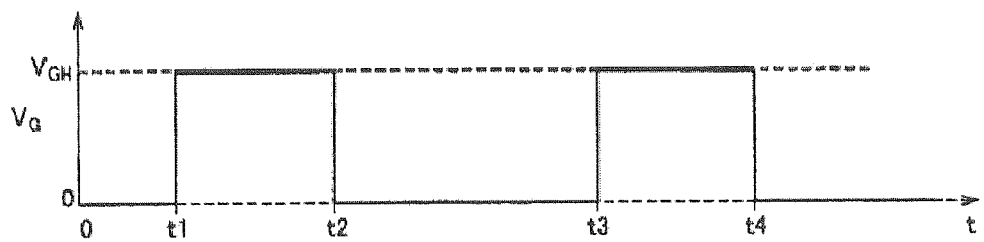
FIG. 9C
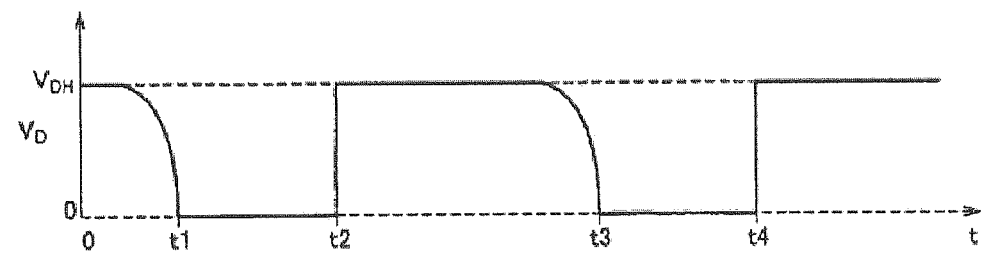
FIG. 9D
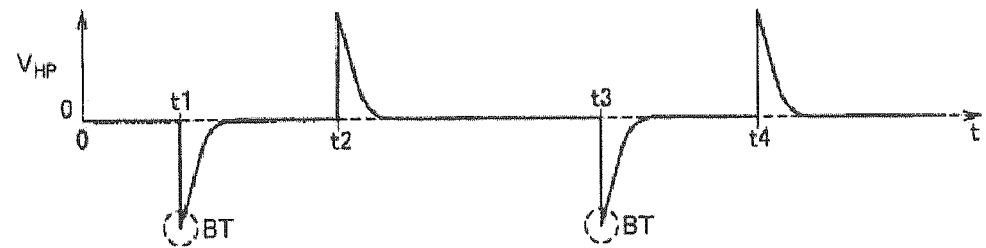
FIG. 9E
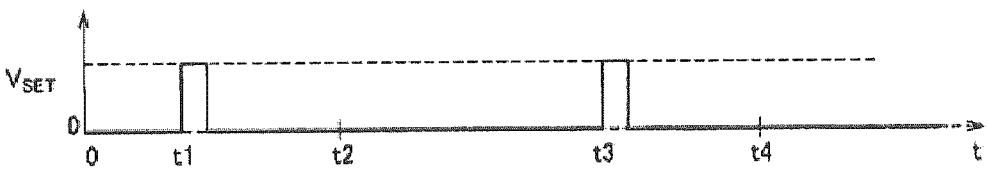
FIG. 9F
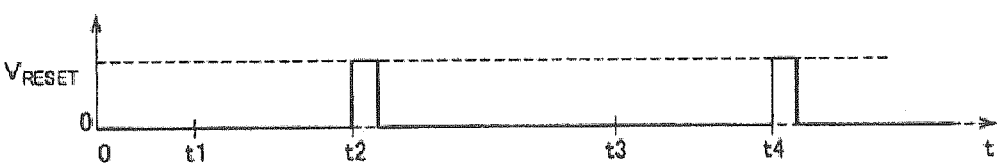

POWER SUPPLY CONTROL CIRCUIT, POWER SUPPLY DEVICE AND ELECTRONIC APPARATUS

CROSS REFERENCE TO RELATED APPLICATIONS

The present application is a continuation application of U.S. patent application Ser. No. 14/548,856, filed on Nov. 20, 2014, the entire contents of which are incorporated herein by reference and priority to which is hereby claimed. Priority under 35 U.S.C. § 119(a) and 35 U.S.C. § 365(b) is hereby claimed from Japanese Application No. 2013-241521, filed Nov. 22, 2013, the disclosures of which are both also incorporated herein by reference.

BACKGROUND

The present invention relates to a power control circuit, a power device and electronic equipment, and more particularly, to a power control circuit, a power device and electronic equipment using coils to perform quasi resonance.

Switch power devices performing quasi resonance (QR) are provided in the industry (referring to patent literatures 1 to 5, for example.)

For example, in a circuit configuration performing quasi resonance, current flowing in a primary side coil of a DC/DC (direct current/direct current) converter has to be monitored, and thus a zero cross point in a time sequence of coil discharging or a bottom of resonance is detected.

BACKGROUND TECHNICAL LITERATURE

Patent Literatures

[Patent literature 1] Japanese patent publication 2010-45939
[Patent literature 2] Japanese patent publication 2007-110878
[Patent literature 3] Japanese patent publication 2007-104759
[Patent literature 4] Japanese patent publication 2009-527215
[Patent literature 5] WO2011/122314

BRIEF SUMMARY OF THE INVENTION

Problem to be Solved in the Present Invention

It is an object of the present invention to provide a power control circuit, a power device and an electronic equipment using the power circuit, wherein a coil is used to perform quasi resonance in the power control circuit, current flowing in the coil is monitored with a simple configuration, and a bottom detection at a zero cross point or quasi resonance is performed.

Technical Solution

In accordance with an aspect of the present invention, a power control circuit is provided. The power control circuit includes: a high pass filter connected to a drain of a metal-oxide-semiconductor field effect transistor (MOSFET), which is serially connected between an inductor connected to an alternating-current wire and a current sensing resistor connected to a ground potential; and a quasi-resonant control circuit connected to the high pass filter and the MOSFET, wherein when an inductor-current of the inductor is conducted in a discharging time sequence, the quasi resonance control circuit performs quasi resonance control upon the inductor-current of the inductor at a zero crossing point or a bottom point in the discharging time sequence based on an output of the high pass filter.

In accordance with another aspect of the present invention, a power device is provided. The power device includes an inductor connected to an alternating-current wire; a current sensing resistor connected to a ground potential; a MOSFET connected between the inductor and the current sensing resistor in series; a high pass filter connected to a drain of the MOSFET; and a quasi-resonant control circuit connected to the high pass filter and the MOSFET, wherein when an inductor-current of the inductor is conducted in a discharging time sequence, the quasi resonance control circuit performs quasi resonance control upon the inductor-current of the inductor at a zero crossing point or a bottom point in the discharging time sequence based on an output of the high pass filter.

In accordance with another aspect, electronic equipment having the above power device is provided.

Effects of the Present Invention

In accordance with the present invention, a power control circuit, a power device and an electronic equipment using the power control circuit are provided, wherein a coil is used to perform quasi resonance in the power control circuit, and current flowing in the coil is monitored with a simple configuration so as to perform a bottom detection at a zero cross point or resonance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6A to FIG. 6E illustrate the operations of performing pulse-width modulation (PWM) frequency fixing control without using QR frequency control, in which FIG. 6A shows an exemplary waveform of a gate voltage $V_G$, FIG. 6B shows an exemplary waveform of a current sensing voltage $V_{CS}$, FIG. 6C shows an exemplary waveform of inductor-current $I_L$, FIG. 6D shows an exemplary waveform of a drain voltage $V_D$, and FIG. 6E shows an exemplary waveform of a regulator terminal voltage $V_{ZT}$.

FIG. 7A to FIG. 7E illustrate operations of a power device using QR frequency control in accordance with a comparative example, in which FIG. 7A shows an exemplary waveform of a gate voltage $V_G$, FIG. 7B shows an exemplary waveform of a current sensing voltage $V_{CS}$, FIG. 7C shows an exemplary waveform of inductor-current $I_L$, FIG. 7D shows an exemplary waveform of a drain voltage $V_D$, and FIG. 73E shows an exemplary waveform of a regulator terminal voltage $V_{ZT}$.

FIG. 8A to FIG. 8E illustrates operations of a power device using QR frequency control in accordance with some embodiments of the present invention, in which FIG. 8A shows an exemplary waveform of a gate voltage $V_G$, FIG. 8B shows an exemplary waveform of a current sensing voltage $V_{CS}$, FIG. 8C shows an exemplary waveform of inductor-current $I_L$, FIG. 8D shows an exemplary waveform of a drain voltage $V_D$, and FIG. 8E shows an exemplary waveform of a high pass filer (HPF) terminal voltage $V_{HP}$.

FIG. 9A to FIG. 9F illustrate operations of a power device using QR frequency control in accordance with some embodiments of the present invention, in which FIG. 9A shows an exemplary waveform of inductor-current $I_L$, FIG. 9B shows an exemplary waveform of a gate voltage $V_G$, FIG. 9C shows an exemplary waveform of a drain voltage $V_D$, FIG. 9D shows an exemplary waveform of an HPF terminal voltage $V_{HP}$ FIG. 9E shows an exemplary waveform of a setting voltage $V_{SET}$, and FIG. 9F shows an exemplary waveform of a reset voltage $V_{RESET}$.

FIG. 10A and FIG. 10B illustrate detailed operations of a power device using QR frequency control in accordance with some embodiments of the present invention, in which FIG. 10A shows an exemplary waveform of an HPF terminal voltage $V_{HP}$, and FIG. 10B shows various waveforms of an HPF terminal voltage $V_{HP}$.

DETAILED DESCRIPTION

Figure 1:
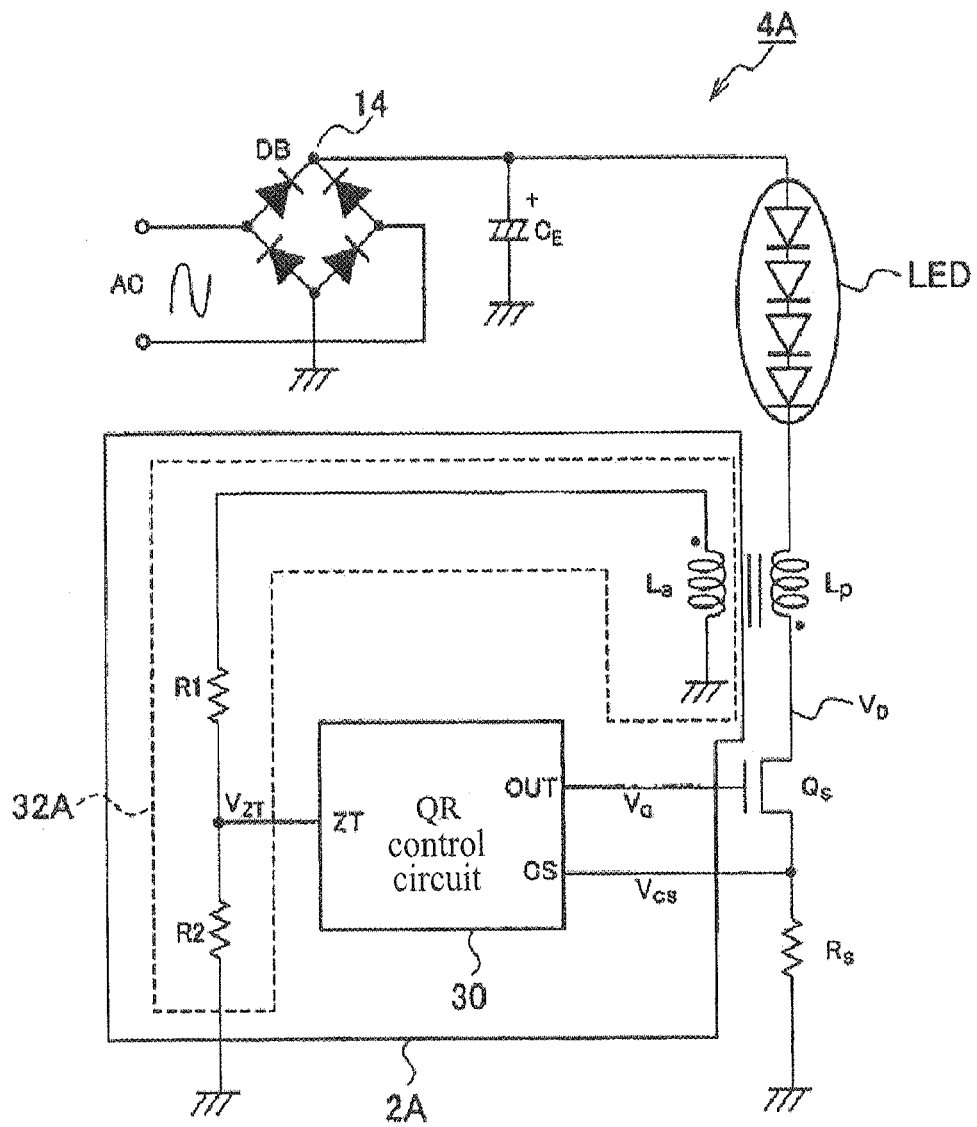
FIG. 1 illustrates a schematic circuit configuration of a power device in accordance with a comparative example.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Then, embodiments of the present invention are illustrated in light of drawings. In the following descriptions and drawings, similar or identical reference numerals are referred to similar or identical elements. However, it should be noted that the drawing s are schematic views, and the size and thickness of each element may not be drawn in scale. Therefore, the specific thickness or size should be determined according to the following descriptions. Further, the size relationship or different ratio is certainly included among the drawings.

Furthermore, the technical concept of the present invention is specified as a device or a method, which is illustrated in the following embodiments. The material, shape, structure, arrangement and etc. of each component of the present invention are not limited to the following embodiments. Variations may be applied to the following embodiments without departing the scope or spirit of claims of the present invention.

COMPARATIVE EXAMPLE

Figure 2:
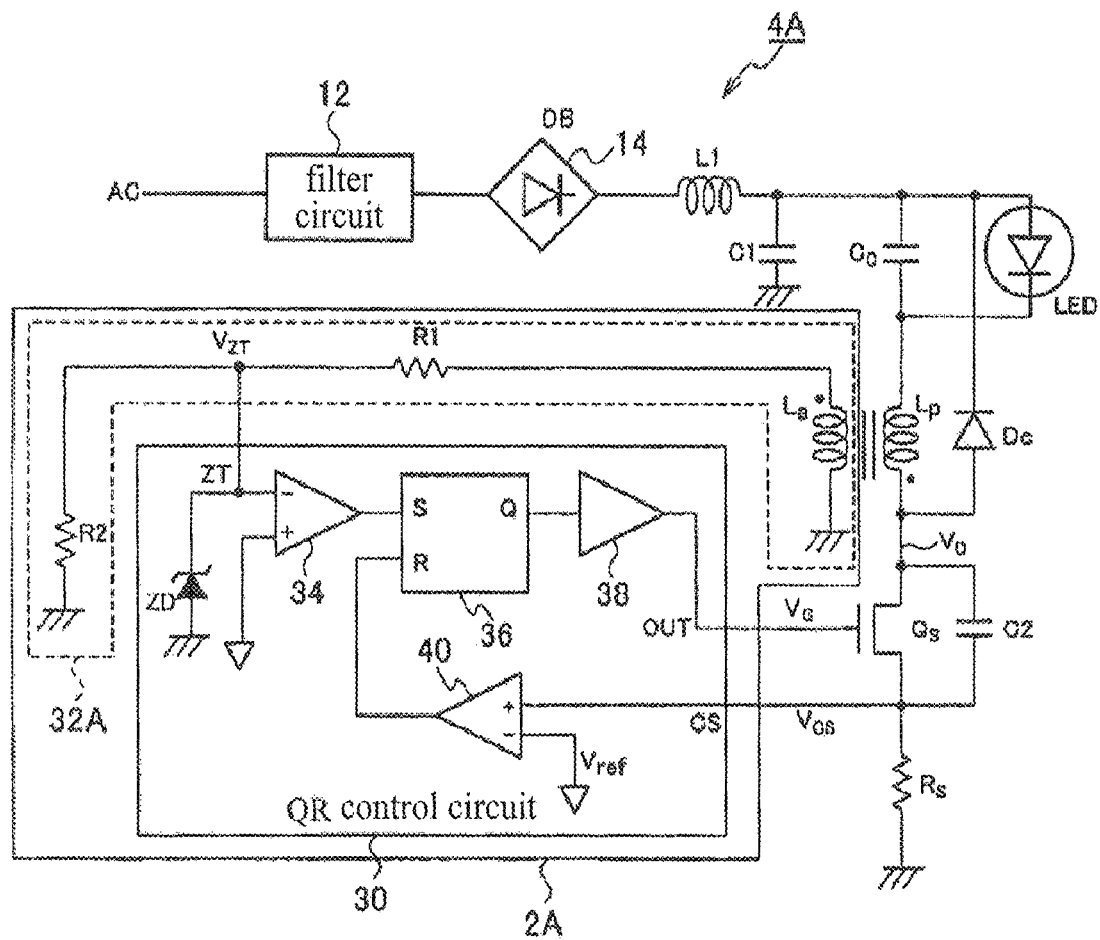
FIG. 2 illustrates a detailed circuit configuration of a power device in accordance with a comparative example.

FIG. 1 illustrates a circuit configuration of a power device 4A according to a comparative example. Further, the detailed circuit configuration is shown in FIG. 2. The power device 4A of the comparative example is corresponding to a buck LED illumination device.

As shown in FIG. 1, the power device 4A of the comparative example includes: a diode bridge (DB) 14 connected to an AC input; an electrolytic capacitor $C_E$ connected to the diode bridge (DB) 14; a inductor $L_P$ connected to an AC wire side via a load (LED); a current sensing resistor $R_S$ connected to ground potential; a plurality of MOSFET Qs connected between the inductor $L_P$ and the current sensing resistor $R_S$ in series; and a power control circuit 2A coupled to the inductor $L_P$, the MOSFET Qs and the current sensing resistor $R_S$ for performing QR control to inductor-current $I_L$ flowing through the inductor $L_P$.

The power control circuit 2A includes: a detection circuit 32A for the inductor-current $I_L$ flowing through the inductor $L_P$; and a QR control circuit 30 connected to the detection circuit 32A, the MOSFET Qs and the current sensing resistor $R_S$ for performing QR control upon the inductor-current $I_L$ at a zero cross point or bottom point in the discharging time sequence of discharging the inductor $L_P$ based on an output of the detection circuit 32A.

Herein, the detection circuit 32A includes: an auxiliary wiring inductor $L_a$ electromagnetically coupled to the inductor $L_P$; and a first resistor R1 and a second resistor R2 connected between the auxiliary wiring inductor $L_a$ and ground potential in series.

More specifically, as shown in FIG. 2, the power device 4A of the comparative example includes: a filter circuit 12 connected to the AC input; a diode bridge (DB) 14 connected to the filter bridge 12; an LC circuit (L1-C1) connected to the diode bridge (DB) 14 for smoothing a rectified waveform; an inductor $L_P$ connected to an AC input a load (LED); a current sensing resistor $R_S$ connected to ground potential; MOSFET Qs connected between the inductor $L_P$ and the current sensing resistor $R_S$ in series; and a power control circuit 2A coupled to the inductor $L_P$, the MOSFET Qs, the current sensing resistor $R_S$ for performing QR control to inductor-current $I_L$ flowing through the inductor $L_P$.

Moreover, as shown in FIG. 2, the power device 4A of the comparative example includes: a regeneration capacitor $C_C$ connected to an inductor $L_P$ in series and connected to a load (LED) in parallel; and a regeneration diode (buffer diode) Dc connected to the regeneration capacitor $C_C$ and the inductor $L_P$ in parallel, which are connected in series. Further, a capacitor C2 is equivalently connected between sources and drains of the MOSFET Qs.

In comparison with a drain voltage $V_D$ of the MOSFET Qs connected to the inductor $L_P$, a regulator terminal voltage $V_{ZT}$ at the connection point connecting the first resistor R1 and the second resistor R2 of a regulator terminal ZT connected to the QR control circuit 30 is reduced to 1/100, for example. Further, as shown in FIG. 2, a Zener diode ZD is connected to the regulator terminal ZT.

As shown in FIG. 2, the QR control circuit 30 applied to the power device 4A of the comparative example includes: a current detection comparator 34 connected to the regulator terminal ZT; an error amplifier 40 connected to a current sensing terminal CS and performing a comparison with a reference voltage $V_{ref}$; an $R_S$ trigger 36 connected to an output of the current detection comparator 34 and an output of the error amplifier 40 and outputting a control signal of the MOSFET Qs; and a buffer 38 connected to an output Q of the $R_S$ trigger 36 and driving the MOSFET Qs.

Herein, the MOSFET Qs are controlled to be conductive while the $R_S$ trigger 36 performs a setting action, and the MOSFET Qs are controlled to be non-conductive while the $R_S$ trigger 36 performs a resetting action.

In the power control circuit 2A applied in the power device 4A of the comparative example, an auxiliary wire of a transformer is wound to form an auxiliary wiring inductor La. In other words, the zero cross point or a bottom point is monitored by the detection circuit 32A using the auxiliary winding.

In the comparative example, the power device 4A for the LED illumination needs the auxiliary winding of the transformer, and thus the total weight and volume of the transformer are increased.

Embodiments

Figure 3:
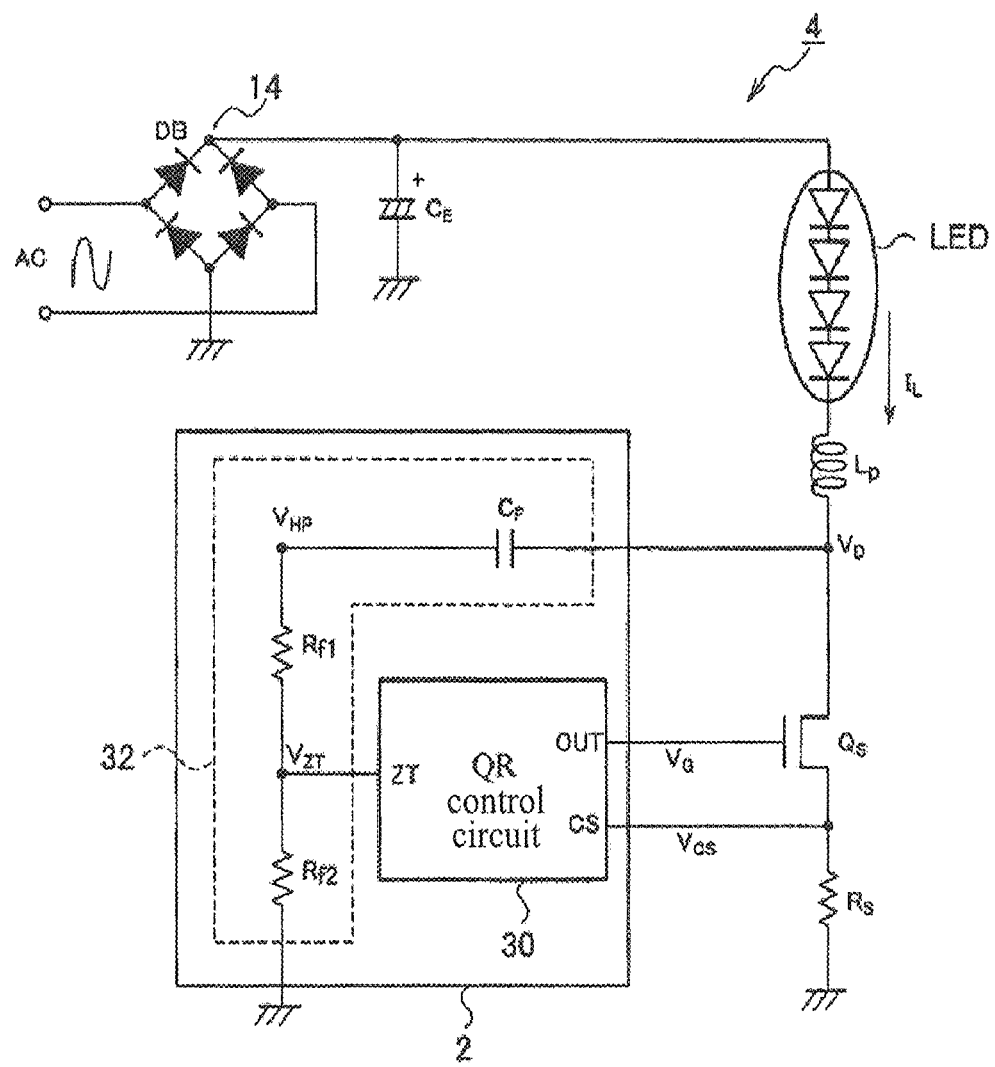
FIG. 3 illustrates a schematic circuit configuration of a power device in accordance with some embodiments of the present invention.
Figure 4:
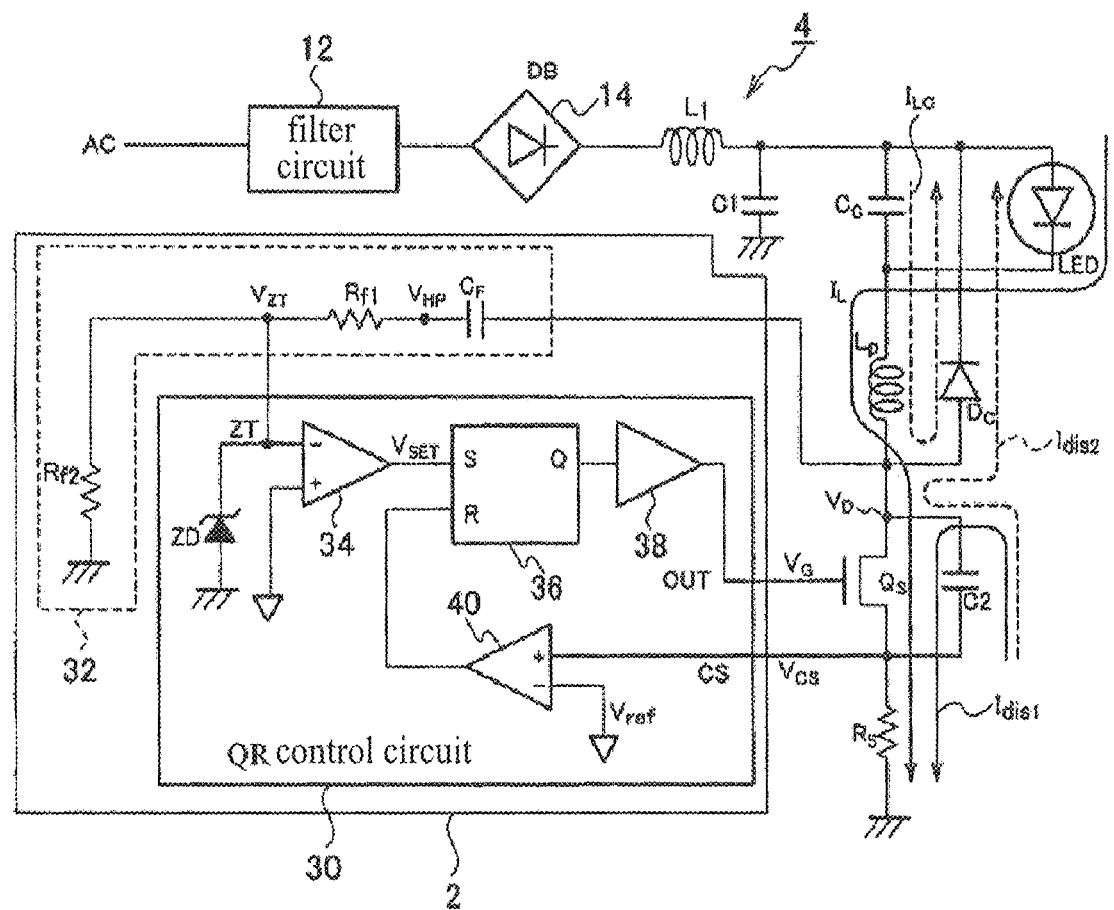
FIG. 4 illustrates a detailed circuit configuration of a power device in accordance with some embodiments of the present invention.

FIG. 3 illustrates a schematic circuit configuration of a power device 4 according to an embodiment of the present invention. Further, the detailed circuit configuration is shown in FIG. 4. The power device 4 of the embodiment is corresponding to a buck LED illumination device.

As shown in FIG. 3, the power device 4 includes: a diode bridge (DB) 14 connected to an AC input; an electrolytic capacitor $C_E$ connected to the diode bridge (DB) 14; an inductor $L_P$ connected to an AC wire side via a load (LED); a current sensing resistor $R_S$ connected to ground potential; MOSFET Qs connected between the inductor $L_P$ and the current sensing resistor $R_S$ in series; and a power control circuit 2 coupled to the inductor $L_P$, the MOSFET Qs and the current sensing resistor $R_S$ for performing QR control to inductor-current $I_L$ flowing through the inductor $L_P$.

The power control circuit 2 includes: a detection circuit 32 for detecting inductor-current $I_L$ flowing through the inductor $L_P$; a QR control circuit 30 connected to the detection circuit 32, the MOSFET Qs and the current sensing resistor $R_S$, wherein when the inductor-current $I_L$ of the inductor $L_P$ is conducted in a discharging time sequence, the quasi resonance control circuit 30 performs quasi resonance control upon the inductor-current $I_L$ of the inductor $L_P$ at a zero crossing point or a bottom point in the discharging time sequence based on an output of the detection circuit 32.

Herein, the detection circuit 32 may include a high pass filer (HPF) connected to a drain of the MOSFET Qs connected to the inductor $L_P$.

As shown in FIG. 3 and FIG. 4, the HPF includes: a capacitor $C_F$ connected to a drain of MOSFET Qs; and a first resistor $R_{f1}$ and a second resistor $R_{f2}$ connected between the capacitor $C_F$ and ground potential in series, and a regulator terminal ZT of a QR control circuit 30 is connected to a connection point connecting the first resistor $R_{f1}$ and the second resistor $R_{f2}$.

The zero cross point is monitored by the power control circuit 2 using the HPF, wherein the power control circuit 2 is applied to the power device 4 of the embodiment. The decreasing of the drain voltage $V_D$ may be detected by an AC component of the HPF. In other words, a decreasing point of a waveform of the drain voltage $V_D$ may be detected by the HPF.

The QR control circuit 30 is used for connecting an output OUT to a gate of MOSFET Qs, detecting current conducted in the detection circuit 32, and, when the inductor-current $I_L$ of the inductor $L_P$ is conducted in a discharging time sequence, controlling the MOSFET Qs to conduct at a zero cross point or a bottom point in the discharging time sequence based on an output of the detection circuit 32.

Further, the QR control circuit 30 may be used for detecting current conducted in the current sensing resistor $R_S$, and controlling the MOSFET Qs to be non-conductive at a specific reset time point.

More specifically, as shown in FIG. 4, a power device 4 of the embodiment includes: a filter circuit 12 connected to an AC (Alternative Current) input; a diode bridge (DB) 14 connected to the filter circuit 12; an LC circuit (L1-C1) connected to the diode bridge (DB) 14 for smoothing a rectified waveform; an inductor $L_P$ connected to the AC input side via a load (LED); a current sensing resistor $R_S$ connected to ground potential; MOSFET Qs connected between the inductor $L_P$ and the current sensing resistor $R_S$ in series; and a power control circuit 2 coupled to the inductor $L_P$, the MOSFET Qs and the current sensing resistor $R_S$ for performing QR control to inductor-current $I_L$ flowing in the inductor $L_P$.

Furthermore, as shown in FIG. 4, the power device 4 of the embodiment includes: a regeneration capacitor $C_C$ connected to the inductor $L_P$ in series and connected to a load (LED) in parallel; and a regeneration diode (buffer diode) Dc connected to the regeneration capacitor $C_C$ and the inductor $L_P$ in parallel, which are connected in series. Further, a capacitor C2 is equivalently connected between a drain and a source of the MOSFET Qs.

In the detection circuit 32, a direct current component of an HPF terminal voltage $V_{HP}$ at the connection point connecting the capacitor $C_F$ and the first resistor $R_{f1}$ is blocked by the capacitor $C_F$, and a potential difference between a high level and a low level is the same level as a potential difference of a drain voltage $V_D$ of the MOSFET Qs. On the other hand, in comparison with a drain voltage $V_D$ of the MOSFET Qs, a regulator terminal voltage $V_{ZT}$ at a connection point connecting the first resistor $R_{f1}$ and the second resistor $R_{f2}$ of the regulator terminal ZT connected to the QR control circuit 30 is reduced to less than 1/100, for example, and becomes as a differential waveform with a peak shape. Further, as shown in FIG. 4, a Zener diode ZD is connected to the regulator terminal ZT.

As shown in FIG. 4, the QR control circuit 30 of the power device 4 applied in the embodiment includes: a current detection comparator 34 connected to a regulator terminal ZT; an error amplifier 40 connected to a current sensing terminal CS and performing a comparison with a reference voltage $V_{ref}$; an $R_S$ trigger 36 connected to an output of the current detection comparator 34 and an output of the error amplifier 40, and outputting a control signal of the MOSFET Qs; and a buffer 38 connected to an output Q of the $R_S$ trigger 36 for driving MOSFET Qs.

Herein, the MOSFET Qs are controlled to be conductive at a time point of setting actions of the $R_S$ trigger 36, and the MOSFET Qs are controlled to be non-conductive at a time point of resetting actions of the $R_S$ trigger 36.

In the power device 4 of the embodiment, while the MOSFET Qs are conducted, as shown in FIG. 4, inductor-current $I_L$ of the load (LED), the inductor $L_P$ and the MOSFET Qs and discharge current $I_{dis1}$ of the capacitor C2 are conducted from an AC wire side. On the other hand, while the MOSFET Qs are off, regeneration current $I_{LC}$ of the regeneration capacitor $C_C$, the inductor $L_P$ and the regeneration diode (buffer diode) Dc and discharge current $I_{dis2}$ of the capacitor C2 are conducted to flow.

Figure 5A:
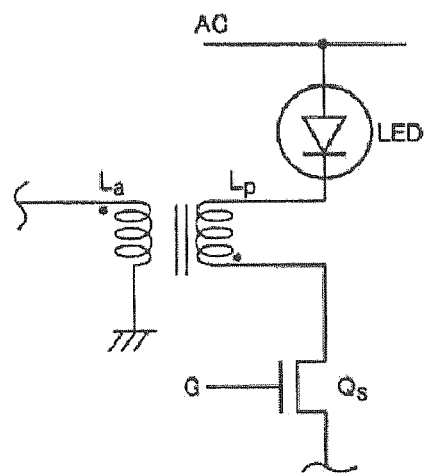
FIG. 5A illustrates a circuit configuration of an auxiliary winding of a transformer and an inductor of a power device in accordance with a comparative example.
Figure 5B:
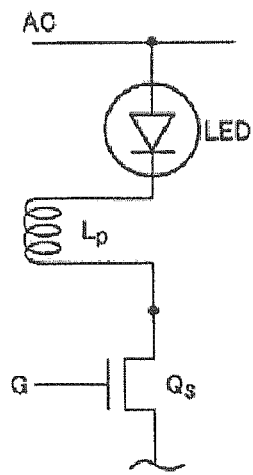
FIG. 5B shows a circuit configuration of an inductor of a power device in accordance with some embodiment of the present invention.

FIG. 5A is a circuit configuration showing an auxiliary winding and an inductor of a transformer of a power device in a comparative example. Herein, an inductor $L_P$ has a value of about 1 mH, for example, and an auxiliary winding inductor $L_a$ has a value of about 100 μH, for example. FIG. 5B illustrates a circuit configuration of an inductor of a power device according to an embodiment. Herein, an inductor $L_P$ has a value of about 1 mH, for example, and having the same level as the value of the inductor $L_P$ shown in FIG. 5A.

The detection circuit 32 of the power control circuit 2 applied in the power device 4 of the embodiment may be formed by a HPF with simple circuitry. Further, there is no need to use an auxiliary winding of a transformer, so as to reduce the total weight and volume of the transformer.

The power device 4 of the embodiment forms a buck LED illumination device using the inductor $L_P$ rather than using an auxiliary winding inductor, so as to achieve applications with low cost and high efficiency.

Comparative Example: PWM Fixed Frequency Control

Figure 6A:
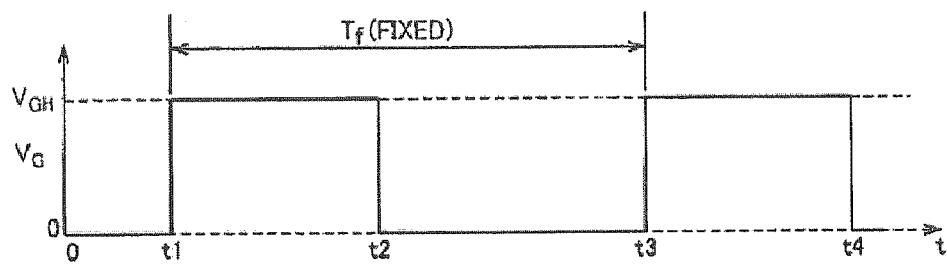
Figure 6B:
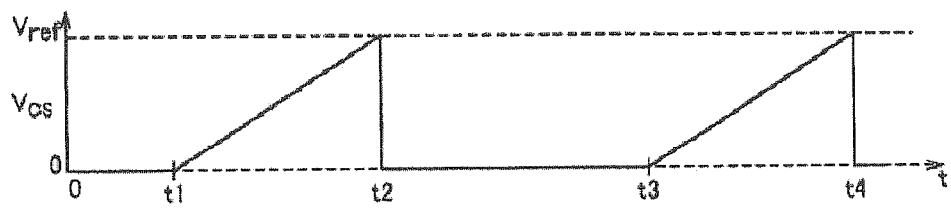
Figure 6C:
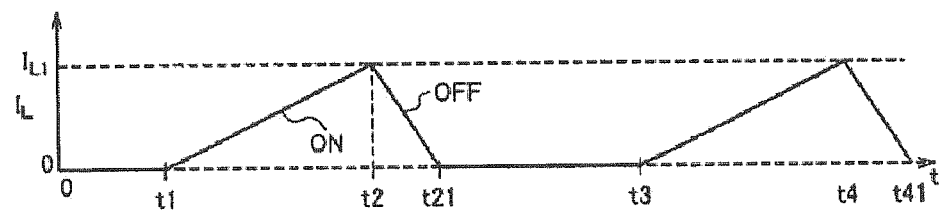
Figure 6D:
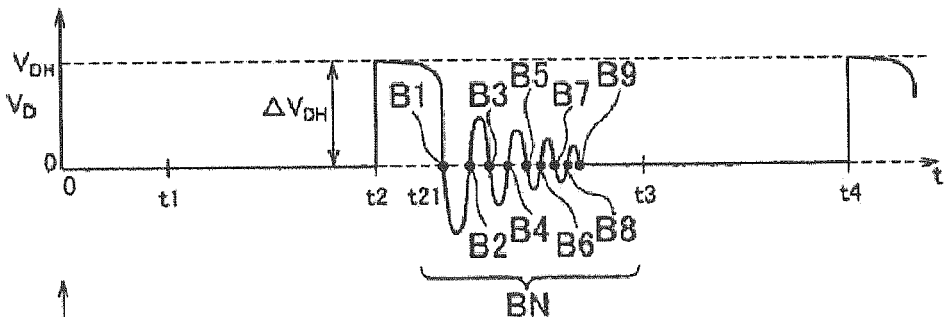
Figure 6E:
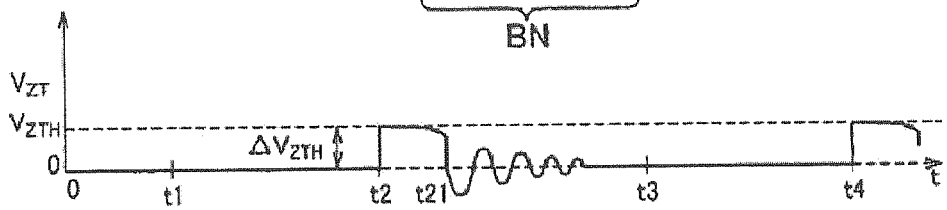

FIGS. 6A-FIG. 6E illustrate the operation of PWM fixed frequency control without using QR frequency control, wherein FIG. 6A shows an exemplary waveform of a gate voltage $V_G$, FIG. 6B shows an exemplary waveform of a current sensing voltage $V_{CS}$, FIG. 6C shows an exemplary waveform of inductor-current $I_L$, FIG. 6D shows an exemplary waveform of a drain voltage $V_D$, and FIG. 6E shows an exemplary waveform of a regulator terminal voltage $V_{ZT}$.

In the operations of the PWM fixed frequency control, a PWM signal with a fixed frequency is input to a setting terminal S of the $R_S$ trigger 36 shown in FIG. 2. As shown in FIG. 6A, an exemplary waveform of a gate voltage $V_G$ has a fixed period $T_f$(FIXED). Along with the fixed period $T_f$(FIXED), the fixed frequency of the PWM is in a range from about 100 kHz to about 300 kHz.

First, at time t1, as shown in FIG. 6A, when the waveform of the gate voltage $V_G$ is in the status of being conducted (ON), the MOSFET Qs are conductive, the waveform of the current sensing voltage $V_{CS}$ is increased as shown in FIG. 6B, and the exemplary waveform of the inductor-current $I_L$ is also increased as shown in FIG. 6C. On the other hand, the waveform of the drain voltage $V_D$ is kept at zero potential shown in FIG. 6D, and also the waveform of the regulator terminal voltage $V_{ZT}$ is kept at zero potential as shown in FIG. 6E.

Next, at time t2, the PWM signal is off, as shown in FIG. 6A, and when the waveform of the gate voltage $V_G$ is in the status of being non-conducted (OFF), in comparison with the reference voltage $V_{ref}$, the current sensing voltage $V_{CS}$ is dramatically reduced as shown in FIG. 6B. On the other hand, as shown in FIG. 6C, during time t2 to time t21, the waveform of the inductor-current $I_L$ is gradually reduced from the current value $I_{L1}$ at time t2. Further, the waveform of the drain voltage $V_D$ is dramatically increased to a voltage $V_{DH}$ as shown in FIG. 6D, and also the waveform of the regulator terminal voltage $V_{ZT}$ is dramatically increased to a voltage $V_{ZTH}$ as shown in FIG. 6E. Herein, a pulse height $\Delta V_{ZTH}$ of the regulator terminal voltage $V_{ZT}$ is about 1/100 of a pulse height $\Delta V_{DH}$ of the drain voltage $V_D$, for example. This is because the resistance of the first resistor R1 and the second resistor R2 serially connected between the auxiliary winding inductor $L_a$ and ground potential shown in FIG. 2 is divided and the voltage value is reduced.

Next, at time t21, when the exemplary waveform of the inductor-current $I_L$ is zero, as shown in FIG. 6D, the waveform of the drain voltage $V_D$ becomes a vibration-reduced waveform having zero cross points B1, B2, B3, B4, . . . , B9 and taking a zero potential level as a center, and noise BN is produced. Meanwhile, as shown in FIG. 6E, the waveform of the regulator terminal voltage $V_{ZT}$ becomes a vibration-reduced waveform taking a zero potential level as a center. The vibration-reduced waveform is determined by the turned-off operation of the MOSFET Qs and a parasitic RLC circuit component connected to the drain of the MOSFET Qs.

Next, after fixed time determined by the fixed period $T_f$ (FIXED), at time t3, the waveform of the gate voltage $V_G$ is again in the status of being conducted (ON), and then the same operations between time t1 and time t3 are repeated.

In the operations of the PWM with fixed frequency control, the frequency of the PWM is fixed, and the noise waveforms are generated as shown in FIG. 6D and FIG. 6E.

Comparative Example: QR Frequency Control

Figure 7A:
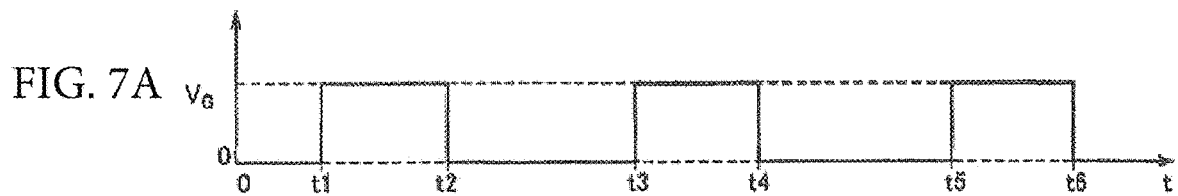
Figure 7B:
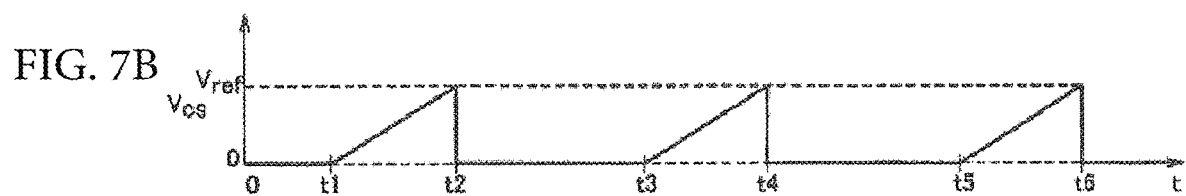
Figure 7C:
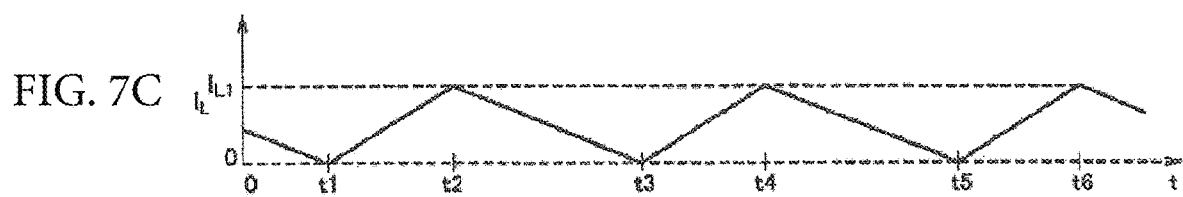
Figure 7D:
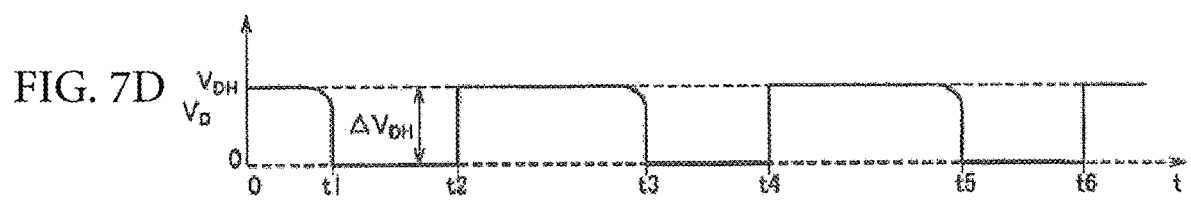
Figure 7E:
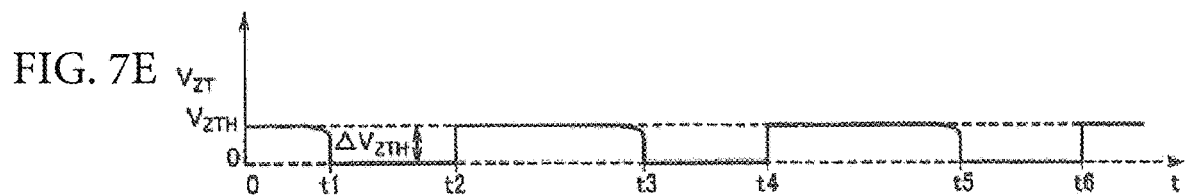

FIGS. 7A-FIG. 7E illustrate operations of a power device 4A (FIG. 1 and FIG. 2) using QR frequency control according to a comparative example, wherein FIG. 7A shows an exemplary waveform of a gate voltage $V_G$, FIG. 7B shows an exemplary waveform of a current sensing voltage $V_{CS}$, FIG. 7C shows an exemplary waveform of inductor-current $I_L$, FIG. 7D shows an exemplary waveform of a drain voltage $V_D$, and FIG. 7E shows an exemplary waveform of a regulator terminal voltage $V_{ZT}$.

First, at time t1, as shown in FIG. 7A, when the waveform of the gate voltage $V_G$ is in the status of being conducted (ON), the MOSFET Qs are conductive, the waveform of the current sensing voltage $V_{CS}$ is increased as shown in FIG. 7B, and the exemplary waveform of the inductor-current $I_L$ is also increased as shown in FIG. 7C. As shown in FIG. 7D, the waveform of the drain voltage $V_D$ is changed from the fixed voltage $V_{DH}$ to zero potential. On the other hand, as shown in FIG. 7E, the waveform of the regulator terminal voltage $V_{ZT}$ is corresponding to potential of a connection point of serially connected resistors ($R_{f1}+R_{f2}$) in the detection circuit 32, so as to become a reduced pulse waveform depending upon a pulse waveform of the waveform of the drain voltage $V_D$ during time 0 to time t1. A pulse height $\Delta V_{ZTH}$ of the regulator terminal voltage $V_{ZT}$ is about 1/100 of a pulse height $\Delta V_{DH}$ of the drain voltage $V_D$, for example. This is because the resistance of the first resistor R1 and the second resistor R2 serially connected between the auxiliary winding inductor $L_a$ and ground potential shown in FIG. 2 is divided and the voltage value is reduced. At time t1, a bottom BT of the waveform of the drain voltage $V_D$ is detected.

During time t1 to time t2, the drain voltage $V_D$ and the regulator terminal voltage $V_{ZT}$ are kept at zero potential.

Next, at time t2, as shown in FIG. 7A, when a reset signal is input to the resetting terminal R of the $R_S$ trigger 36 so as to cause the waveform of the gate voltage $V_G$ in the status of being non-conducted (OFF), in comparison with the reference voltage $V_{ref}$, the current sensing voltage $V_{CS}$ is dramatically reduced as shown in FIG. 7B. On the other hand, as shown in FIG. 7C, during time t2 to time t3, the waveform of the inductor-current $I_L$ is gradually reduced. On the other hand, as shown in FIG. 7D, the waveform of the drain voltage $V_D$ is dramatically increased to a voltage $V_{DH}$, and then kept at a substantially fixed voltage $V_{DH}$. Meanwhile, as shown in FIG. 7E, the waveform of the regulator terminal voltage $V_{ZT}$ is dramatically increased at time t2 to a voltage $V_{ZTH}$, and then kept at a substantially fixed voltage $V_{ZTH}$.

Meanwhile, as shown in FIG. 7C, during time t2 to time t3, the waveform of the inductor-current $I_L$ is reduced from the current value $I_{L1}$ at time t2 to near zero level.

As shown in FIG. 7D, near time t3, the waveform of the drain voltage $V_D$ is dramatically reduced from a substantially fixed voltage $V_{DH}$ to near zero level. Similarly, as shown in FIG. 7E, the waveform of the regulator terminal voltage $V_{ZT}$ is dramatically reduced from a substantially fixed voltage $V_{ZTH}$ to near zero level. Herein, time t3 is corresponding to the time point of the bottom detection. While detecting the bottom BT at time t1 and time t3, the waveform of the gate voltage $V_G$ is in a status of being conducted (ON). Then, the same operations between time t1 and time t3 are repeated.

In the power device (FIG. 1 and FIG. 2) using QR frequency control according to a comparative example, an auxiliary winding inductor $L_a$ is used, so as to increase the total weight and volume of the transformer.

Embodiment: QR Frequency Control

Figure 8A:
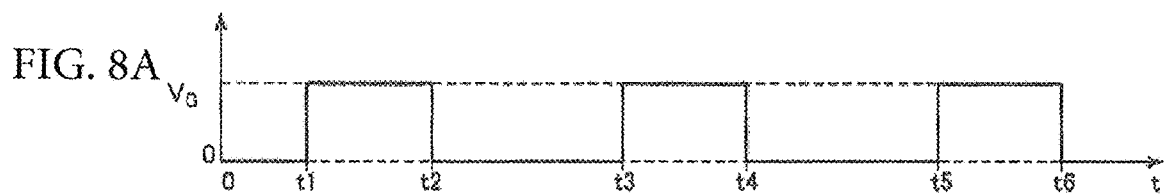
Figure 8B:
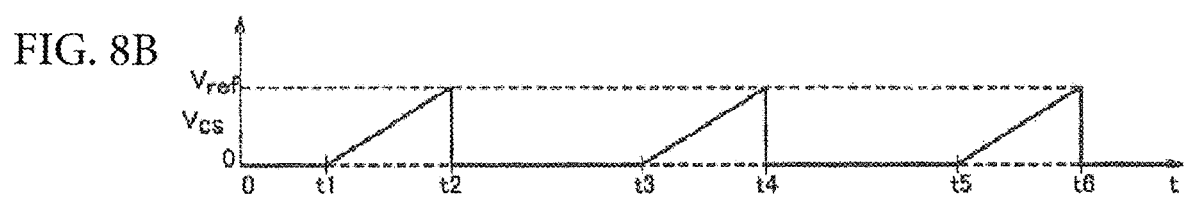
Figure 8C:
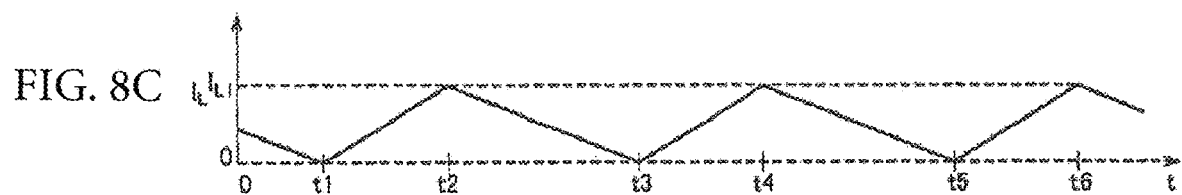
Figure 8D:
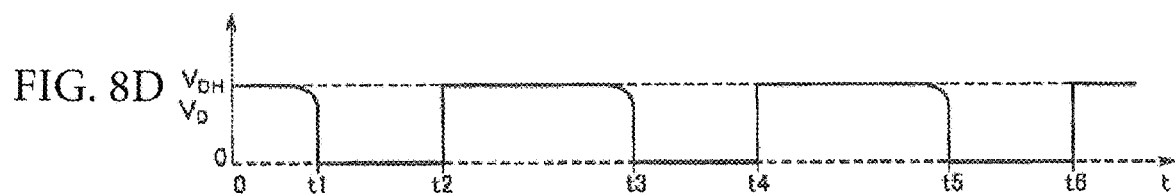
Figure 8E:
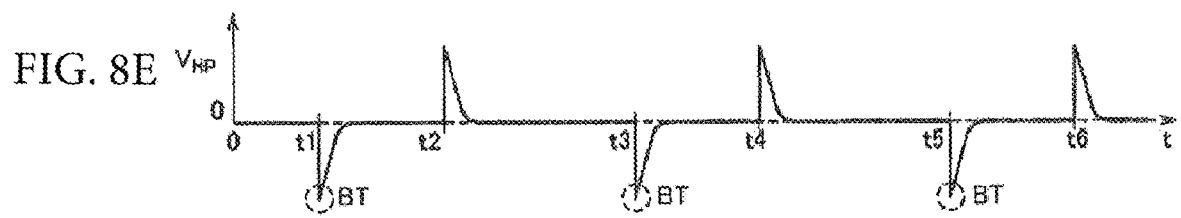

FIG. 8 illustrates operations of a power device (FIG. 3 and FIG. 4) using QR frequency control according some embodiments of the present invention, wherein FIG. 8A shows an exemplary waveform of a gate voltage $V_G$, FIG. 8B shows an exemplary waveform of a current sensing voltage $V_{CS}$, FIG. 8C shows an exemplary waveform of inductor-current $I_L$, FIG. 8D shows an exemplary waveform of a drain voltage $V_D$, and FIG. 8E shows an exemplary waveform of an HPF terminal voltage $V_{HP}$.

First, at time t1, as shown in FIG. 8A, when the waveform of the gate voltage $V_G$ is in the status of being conducted (ON), the MOSFET Qs are conductive, the waveform of the current sensing voltage $V_{CS}$ is increased as shown in FIG. 8B, and the exemplary waveform of the inductor-current $I_L$ is also increased as shown in FIG. 8C. As shown in FIG. 8D, the waveform of the drain voltage $V_D$ is changed from the fixed voltage $V_{DH}$ to zero potential. On the other hand, as shown in FIG. 8E, the waveform of the HPF terminal voltage $V_{HP}$ is corresponding to the potential at two ends of the serially connected resistors ($R_{f1}+R_{f2}$) in the HPF, so as to become a differential waveform depending on a transient response of the waveform of the drain voltage $V_D$. The bottom BT is detected at time t1. After the detection of the bottom BT, the drain voltage $V_D$ and the HPF terminal voltage $V_{HP}$ are kept at zero potential till time t2.

Next, at time t2, when a reset signal is input to a resetting terminal R of the $R_S$ trigger 36 and thus the gate voltage $V_G$ is off, the waveform of the gate voltage $V_G$ is dramatically reduced as shown in FIG. 8A, and also the current sensing voltage $V_{CS}$ in comparison with the reference voltage $V_{ref}$ is dramatically reduced as shown in FIG. 8B. On the other hand, as shown in FIG. 8C, the waveform of the inductor-current $I_L$ is gradually reduced from the current value $I_{L1}$ at time t2 between time t2 and time t3. On the other hand, as shown in FIG. 8D, the waveform of the drain voltage $V_D$ at time t2 is dramatically increased to a voltage $V_{DH}$, and then kept at a substantially fixed voltage $V_{DH}$. Furthermore, as shown in FIG. 8E, the waveform of the HPF terminal voltage $V_{HP}$ becomes a differential waveform depending on a transient response of the waveform of the drain voltage $V_D$. After the transient response, the drain voltage $V_D$ is kept at a substantially fixed voltage $V_{DH}$ and the HPF terminal voltage $V_{HP}$ is kept at zero potential till time t3.

Next, near time t3, the waveform of the drain voltage $V_D$ is dramatically reduced from a substantially fixed voltage $V_{DH}$ to near zero level as shown in FIG. 8D. On the other hand, as shown in FIG. 8E, the waveform of the HPF terminal voltage $V_{HP}$ becomes a differential waveform depending on a transient response of the waveform of the drain voltage $V_D$. The bottom BT is detected at time t3. While detecting the bottoms BT at time t1 and time t3, the gate voltage $V_G$ is in the status of being conducted (ON).

The zero cross point is monitored by the power device 4 using the HPF according to some embodiments of the present invention. The bottom BT may be detected by using the AC component of the HPF at the time point at which the drain voltage $V_D$ is decreased. In other words, the HPF may be used to detect the decreasing point of the waveform of the drain voltage $V_D$.

Then, the same operations between time t1 and time t3 are repeated.

Further, FIG. 9A-FIG. 9F illustrate detailed operations of a power device using QR frequency control according to some embodiments of the present invention, wherein FIG. 9A shows an exemplary waveform of inductor-current $I_L$, FIG. 9B shows an exemplary waveform of a gate voltage $V_G$, FIG. 9C shows an exemplary waveform of a drain voltage $V_D$, FIG. 9D shows an exemplary waveform of an HPF terminal voltage $V_{HP}$, FIG. 9E shows an exemplary waveform of a set voltage $V_{SET}$, and FIG. 9F shows an exemplary waveform of a reset voltage $V_{RESET}$. FIG. 9A is corresponding to FIG. 8C, FIG. 9B is corresponding to FIG. 8A, FIG. 9C is corresponding to FIG. 8D, and FIG. 9D is corresponding to FIG. 8E. Similarly, a bottom is detected at time t1 and time t3.

As shown in FIG. 9E, an exemplary waveform of a set voltage $V_{SET}$ which is input to the setting terminal S of the $R_S$ trigger 36 (FIG. 4) is implemented at time t1 and time t3. As shown in FIG. 9F, an exemplary waveform of a reset voltage $V_{RESET}$ which is input to the resetting terminal R of the $R_S$ trigger 36 (FIG. 4) is implemented at time t2 and time t4. In other words, in the power device 4 (FIG. 3 and FIG. 4) using QR frequency control according to embodiments of the present invention, the conduction control of MOSFET Qs is implemented at the time point at which the $R_S$ trigger 36 performs setting actions, and the non-conduction control of MOSFET Qs is implemented at the time point at which the $R_S$ trigger 36 performs resetting actions. Other actions are similar to those in FIG. 8, and thus the associated descriptions are omitted.

In the power device 4 (FIG. 3 and FIG. 4) using QR frequency control according to embodiments of the present invention, in comparison with the comparative example using an auxiliary winding of a transformer, there is no need to use an auxiliary winding of a transformer, so as to reduce the total weight and volume of a transformer.

(Exemplary Waveform of an HPF Terminal Voltage $V_{HP}$)

Figure 10A:
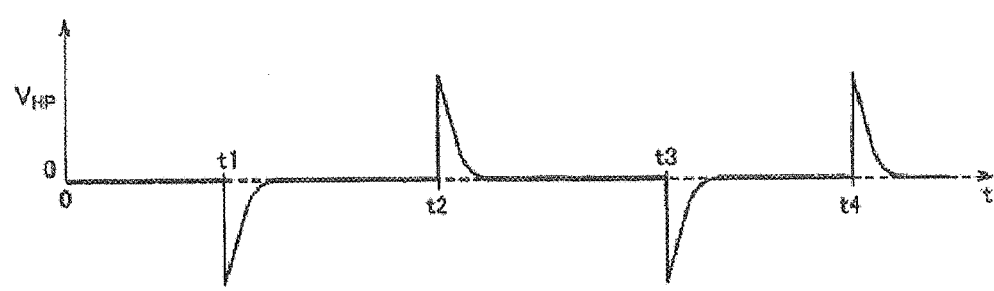
Figure 10B:
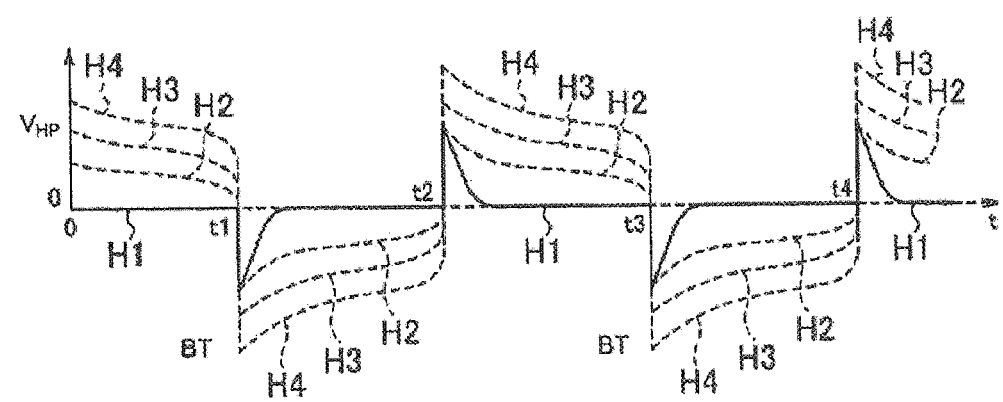

Further, FIG. 10A and FIG. 10B illustrate detailed operations of a power device using QR frequency control according to embodiments of the present invention, wherein FIG. 10A shows an exemplary waveform of an HPF terminal voltage $V_{HP}$, and FIG. 10B shows various exemplary waveforms of the HPF terminal voltage $V_{HP}$. The exemplary waveform in FIG. 10A is corresponding to that in FIG. 8E or FIG. 9D. On the other hand, as shown in FIG. 10B, the exemplary waveform of the HPF terminal voltage $V_{HP}$ has various shapes according to a value of a time constant $(R_{f1}+R_{f2})C_F$ determined by a capacitor $C_F$, a first resistor $R_{f1}$ and a second resistor $R_{f2}$ of the HPF. In FIG. 10B, the values of the time constant are increased and set according to H1, H2, H3 and H4 in sequence.

(Results of Experiments)

Figure 11:
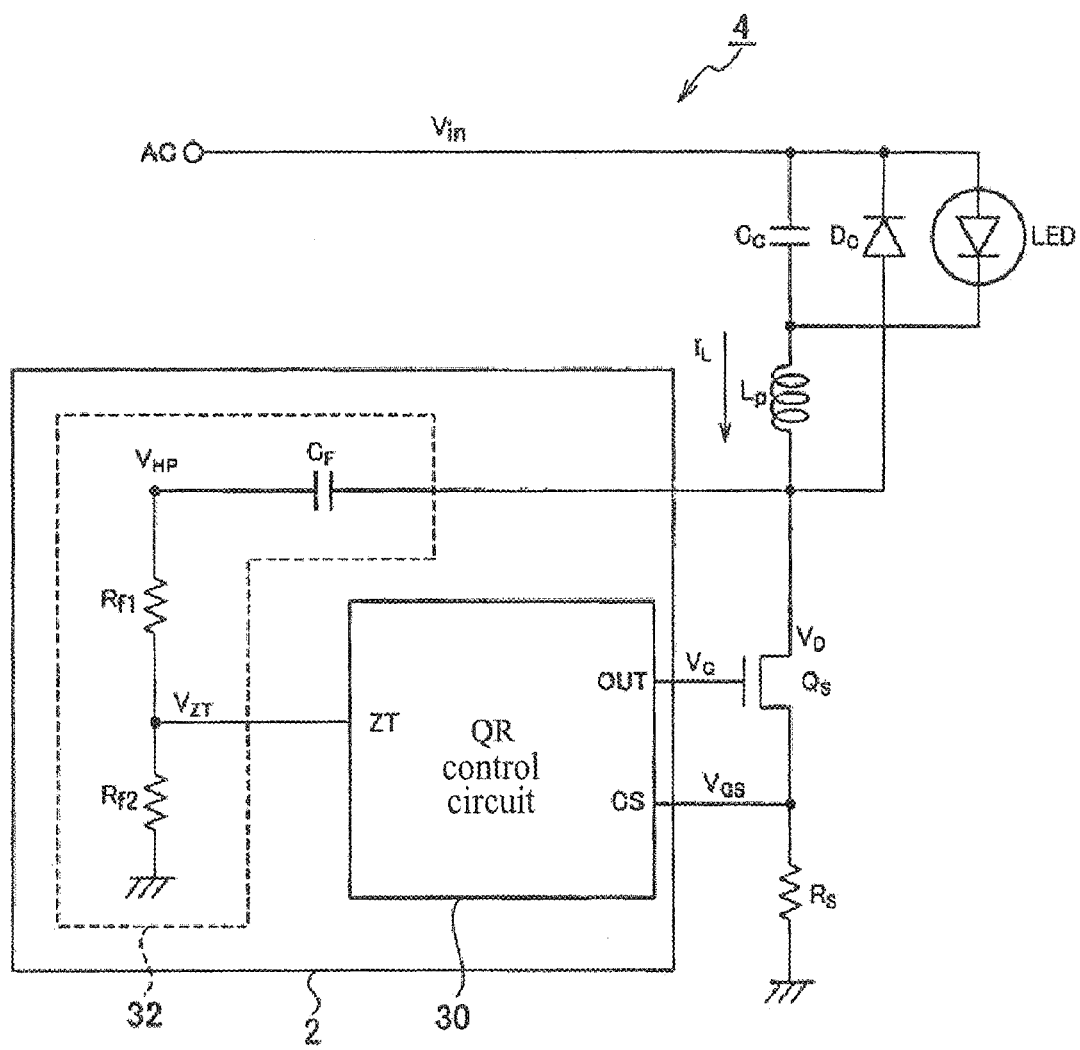
FIG. 11 illustrates a circuit block diagram showing experimental operations of a power device in accordance with some embodiments of the present invention.

FIG. 11 is a circuit block diagram showing experimental operations of a power device 4 in accordance with some embodiments of the present invention. In FIG. 11, a diode bridge (DB) 14 is omitted for simplification. An input voltage $V_{in}$ is corresponding to a full wave rectified waveform of the rectified AC input.

In FIG. 11, the circuit constants of the HPF are illustrated as follows. For example, the value of the capacitor $C_F$ is about 100 pF, and the withstand voltage of the capacitor $C_F$ is about 1 kV. The value of the first resistor $R_{f1}$ is about 1 MΩ, and the value of the second resistor $R_{f2}$ is about 10 1 kΩ, for example. Accordingly, the value of the time constant $(R_{f1}+R_{f2})C_F$ is about 0.1 msec.

For example, the operation switching frequency of the power device according to embodiments of the present invention is in a range from about 20 kHz to about 200 kHz.

Figure 12:
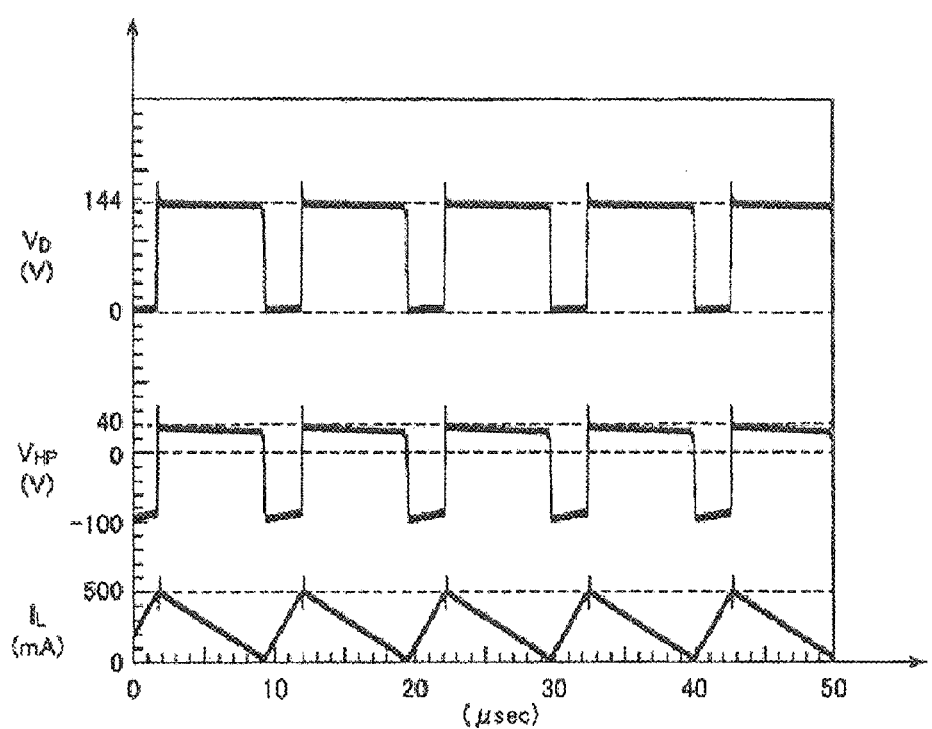
FIG. 12 illustrates results of experimental operations of a power device in accordance with some embodiments of the present invention, in which an exemplary waveform of a drain voltage $V_D$, an exemplary waveform of an HPF terminal voltage $V_{HP}$ and an exemplary waveform of inductor-current $I_L$ are illustrated.

Further, FIG. 12 illustrates results of experimental operations of a power device 4 in accordance with some embodiments of the present invention, in which an exemplary waveform of a drain voltage $V_D$, an exemplary waveform of an HPF terminal voltage $V_{HP}$ and an exemplary waveform of inductor-current $I_L$ are illustrated. The action waveforms shown in FIG. 12 are corresponding to the exemplary waveforms of the drain voltage $V_D$ in FIG. 8D and FIG. 9C, the exemplary waveforms of the HPF terminal voltage $V_{HP}$ in FIG. 8E and FIG. 9D, and the exemplary waveforms of the inductor-current $I_L$ in FIG. 8C and FIG. 9A.

The vertical axis of the waveform of the drain voltage $V_D$ is 100 V/div, and the duty cycle is about 74.5%. Further, the operation switching frequency of the drain voltage $V_D$ is about 48.30 kHz.

In the detection circuit 32, the DC component of the waveform of the drain voltage $V_D$ is blocked by the capacitor $C_F$ to form an output waveform of the HPF terminal voltage $V_{HP}$. The vertical axis of the waveform of the HPF terminal voltage $V_{HP}$ is 100 V/div.

The vertical axis of the waveform of the inductor-current $I_L$ is 500 mA/div, and the horizontal axis is 5 μsec/div.

Figure 13:
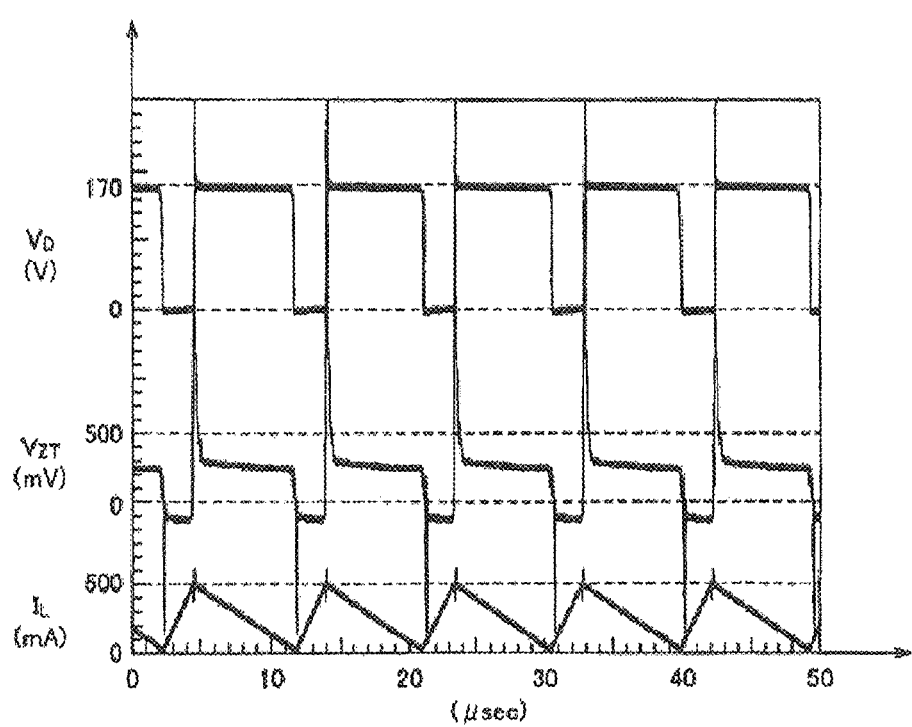
FIG. 13 illustrates results of experimental operations of a power device in accordance with some embodiments of the present invention, in which an exemplary waveform of a drain voltage $V_D$, an exemplary waveform of a regulator terminal voltage $V_{ZT}$ and an exemplary waveform of inductor-current $I_L$ are illustrated.

Further, FIG. 13 illustrates results of experimental operations of a power device 4 in accordance with some embodiments of the present invention, in which an exemplary waveform of a drain voltage $V_D$, an exemplary waveform of a regulator terminal voltage $V_{ZT}$ and an exemplary waveform of inductor-current $I_L$ are illustrated. The action waveforms shown in FIG. 13 are corresponding to the exemplary waveforms of the drain voltage $V_D$ in FIG. 8D and FIG. 9C, the exemplary waveform of the regulator terminal voltage $V_{ZT}$ in FIG. 7E under the same detection in the comparative example, and the exemplary waveforms of the inductor-current $I_L$ in FIG. 8C and FIG. 9A. The exemplary waveform of the regulator terminal voltage $V_{ZT}$ shown in FIG. 13 is corresponding to the potential of the connection point connecting the first resistor $R_{f1}$ and the second resistor $R_{f2}$.

The vertical axis of the waveform of the drain voltage $V_D$ is 100 V/div, and the duty cycle is about 77.86%. Further, the operation switching frequency of the drain voltage $V_D$ is about 52.71 kHz.

The vertical axis of the waveform of the regulator terminal voltage is 500 mV/div. The waveform of the regulator terminal voltage $V_{ZT}$ is obtained by dividing the waveform of the HPF terminal voltage $V_{HP}$ by the divided resistance of the first resistor $R_{f1}$ and the second resistor $R_{f2}$, and is input to the regulator terminal ZT of the QR control circuit 30.

When the value, 0.1 V, is obtained from the detection of the regulator terminal ZT, it starts to perform the switching operation. In other words, when the regulator terminal voltage $V_{ZT}$ which is input to the regulator terminal ZT of the QR control circuit 30 is more than 0.1 V, a current detection comparator 34 (FIG. 4) is activated due to the activation of the Zener diode, and a waveform of a set voltage $V_{SET}$ (FIG. 9E) is input to the setting terminal S of the $R_S$ trigger 36 (FIG. 4).

It is similar to FIG. 12 that the vertical axis of the waveform of the inductor-current $I_L$ is 500 mA/div, and the horizontal axis is 5 μsec/div.

(Boost LED Illumination Device)

The power control circuit 2 of embodiments of the present invention may be applied in various power devices. In addition to the buck LED illumination device, the power control circuit 2 may be applied in a boost LED illumination device, a flyback LED illumination device and etc.

Figure 14:
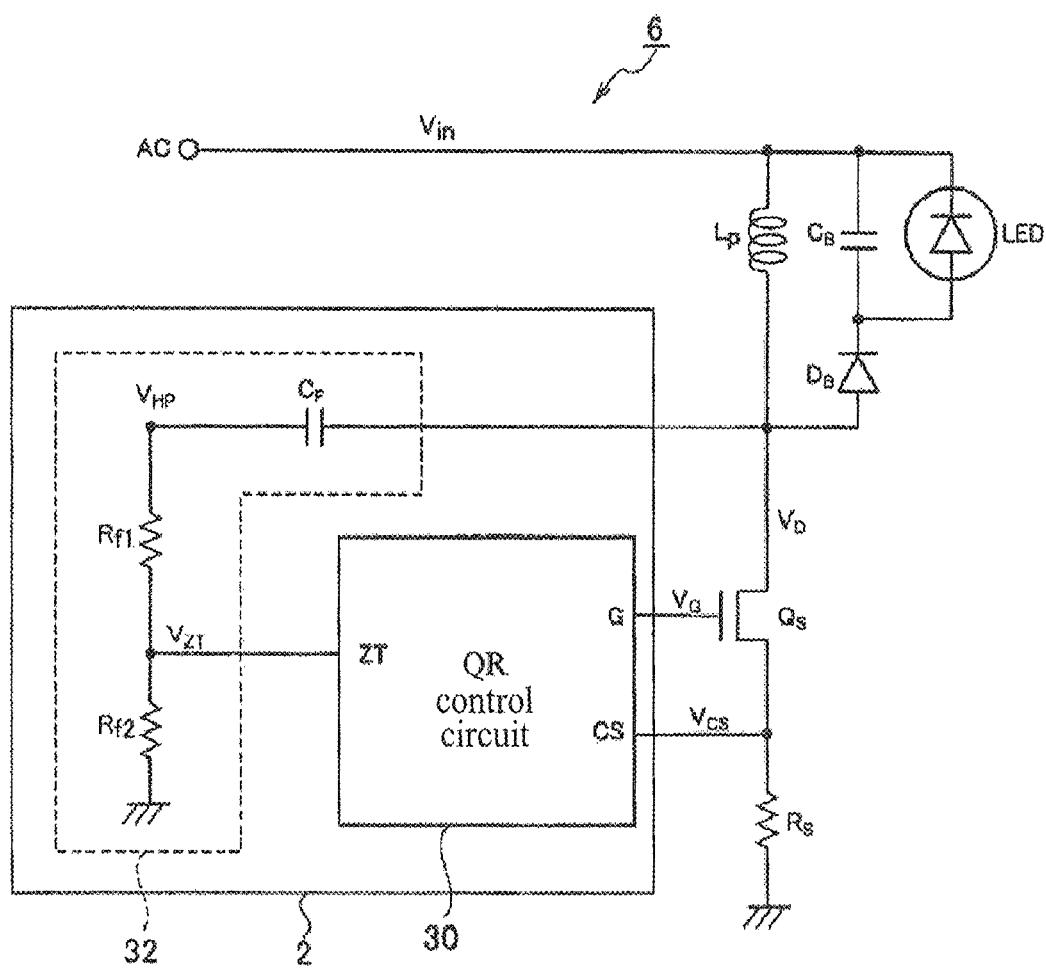
FIG. 14 illustrates a schematic circuit configuration showing a power device in accordance with some embodiments of the present invention, in which an illumination device, a light emitting diode, is illustrated.

FIG. 14 illustrates a schematic circuit block diagram of the power device 6 using the power control circuit 2 according to embodiments of the present invention, which is a boost LED illumination device. The input voltage $V_{in}$ is corresponding to a full wave rectified waveform of the rectified input AC.

As shown in FIG. 14, the power device 6 according to embodiments of the present invention includes an inductor $L_P$ connected to an AC wire side; a current sensing resistor $R_S$ connected to ground potential; MOSFET Qs connected between the inductor $L_P$ and the current sensing resistor $R_S$ in series; and a power control circuit 2 coupled to the inductor $L_P$, the MOSFET Qs and the current sensing resistor $R_S$ for performing QR control upon the current $I_L$ flowing through the inductor $L_P$.

The power control circuit 2 includes a detection circuit 32 for detecting the inductor-current $I_L$ flowing through the inductor $L_P$; and a QR control circuit 30 connected to the detection circuit 32, the MOSFET Qs and the current sensing resistor $R_S$, wherein when the inductor-current $I_L$ of the inductor $L_P$ is conducted in a discharging time sequence, the QR control circuit 30 performs QR control upon the inductor-current $I_L$ of the inductor $L_P$ at a zero crossing point or a bottom point in the discharging time sequence based on an output of the detection circuit 32.

Herein, the detection circuit 32 may include an HPF connected to a drain of the MOSFET Qs connected to the inductor $L_P$.

As shown in FIG. 14, the HPF includes a capacitor $C_F$ connected to a drain of the MOSFET Qs; and a first resistor $R_{f1}$ and a second resistor $R_{f2}$ connected between the capacitor $C_F$ and the ground potential in series, and a regulator terminal ZT of the QR control circuit 30 is connected to a connection point connecting the first resistor $R_{f1}$ and the second resistor $R_{f2}$.

An output OUT is connected to a gate of the MOSFET Qs by the QR control circuit 30 for detecting current conducted in the HPF, and, when the inductor-current $I_L$ of the inductor $L_P$ is conducted in a discharging time sequence, controlling the MOSFET Qs to conduct at a zero cross point or a bottom point in the discharging time sequence based on an output of the detection circuit 32.

Further, the QR control circuit 30 may detect current conducted in the current sensing resistor $R_S$, and control the MOSFET Qs to be non-conductive at a specific reset time point.

As shown in FIG. 14, in the power device 6 according to embodiments of the present invention, an inductor $L_P$ is connected to a regeneration capacitor $C_B$ and a regeneration diode (buffer diode) $D_B$ in parallel, which are connected in series, and the regeneration capacitor $C_B$ is connected to a load (LED) in parallel, so as to form a boost LED illumination device. Other configurations are similar to the power device 4 according to embodiments of the present invention, and thus the associated descriptions are omitted.

By using the power device 6 according to embodiments of the present invention, the boost LED illumination device includes an inductor $L_P$ rather than using an auxiliary winding inductor, so as to reduce the total weight and volume of the transformer, lower cost and increase efficiency.

(Flyback LED Illumination Device)

Figure 15:
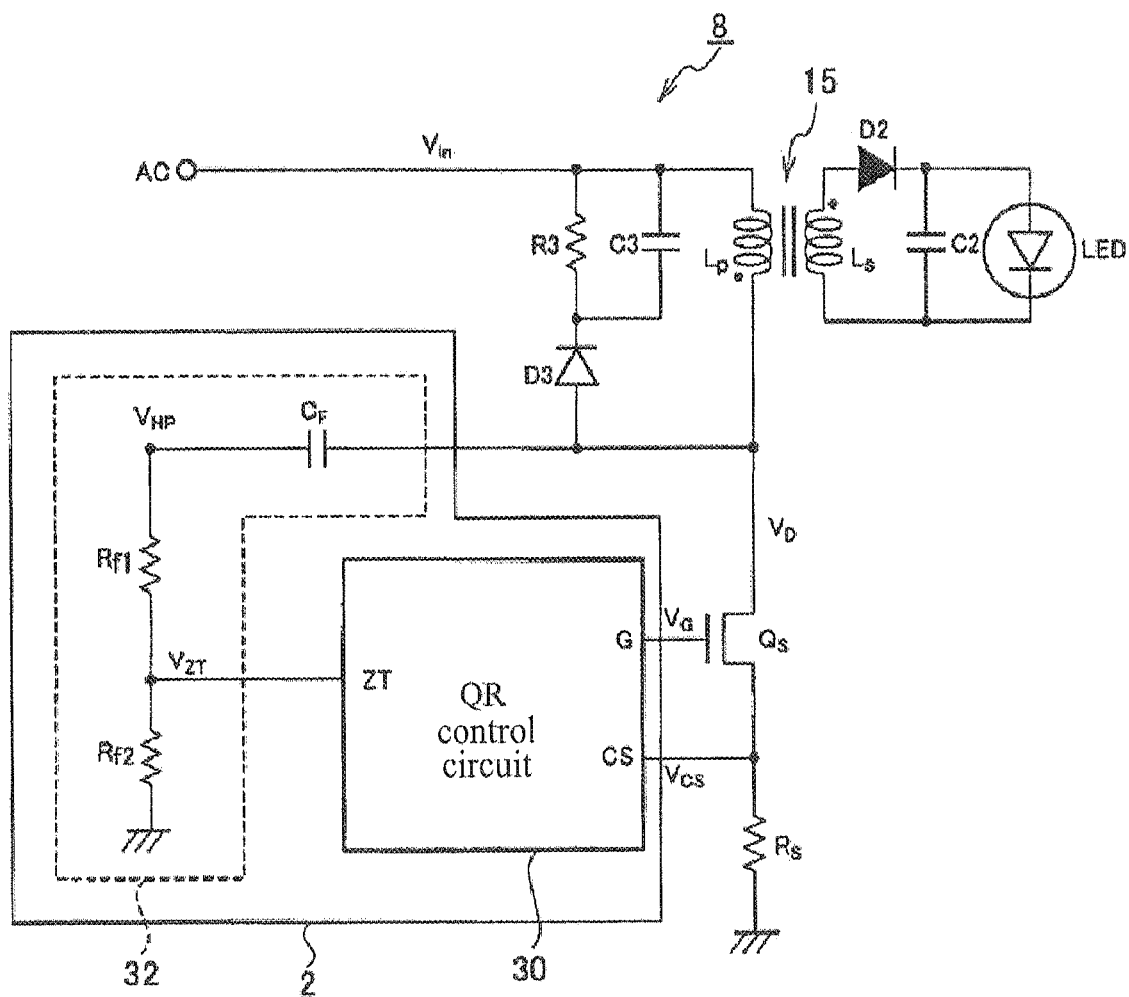
FIG. 15 illustrates a schematic circuit configuration showing a power device in accordance with some embodiments of the present invention, in which a flyback LED illumination device is illustrated.

FIG. 15 illustrates a schematic circuit configuration of the power device 8 using the power control circuit 2 according to embodiments of the present invention, which is a flyback LED illumination device. In FIG. 15, the illustration of diode bridge (DB) 14 is omitted. An input voltage $V_{in}$ is corresponding to a full wave rectified waveform of the rectified AC input.

As shown in FIG. 15, the power device 8 of the embodiments includes an inductor $L_P$ connected to an AC wire side; a current sensing resistor $R_S$ connected to ground potential; MOSFET Qs connected between the inductor $L_P$ and the current sensing resistor $R_S$ in series; and a power control circuit 2 coupled to the inductor $L_P$, the MOSFET Qs and the current sensing resistor $R_S$ for performing QR control upon inductor-current $I_L$ flowing through the inductor $L_P$.

The power control circuit 2 includes a detection circuit 32 for performing a detection of the inductor-current $I_L$ flowing through the inductor $L_P$; and a QR control circuit 30 connected to the detection circuit 32, the MOSFET Qs and the current sensing resistor $R_S$, wherein when the inductor-current $I_L$ of the inductor $L_P$ is conducted in a discharging time sequence, the QR control circuit 30 performs QR control upon the inductor-current $I_L$ of the inductor $L_P$ at a zero crossing point or a bottom point in the discharging time sequence based on an output of the detection circuit 32.

Herein, the detection circuit 32 may include an HPF connected to a drain of the MOSFET Qs connected to the inductor $L_P$.

As shown in FIG. 15, the HPF includes a capacitor $C_F$ connected to a drain of the MOSFET Qs; and a first resistor $R_{f1}$ and a second resistor $R_{f2}$ connected between the capacitor $C_F$ and the ground potential in series; and a regulator terminal ZT of the QR control circuit 30 is connected to the connection point connecting the first resistor $R_{f1}$ and the second resistor $R_{f2}$.

An output OUT is connected to a gate of the MOSFET Qs by the QR control circuit 30 for detecting current conducted in the HPF, and, when the inductor-current $I_L$ of the inductor $L_P$ is conducted in a discharging time sequence, controlling the MOSFET Qs to be conductive at a zero point or a bottom point in the discharging time sequence based on an output of the detection circuit 32.

Further, the QR circuit 30 may be used for detecting current conducted in the current sensing resistor $R_S$, and controlling the MOSFET Qs to be non-conductive at a specific reset time point.

In the power device 8 according to embodiments of the present invention, as shown in FIG. 15, the inductor $L_P$ is used as a primary winding in a flyback transformer 15. Further, a secondary winding $L_S$ of the flyback transformer 15 is connected to a diode rectifying circuit (D2-C2) including a diode D2 and a capacitor C2, and the capacitor C2 is connected to a load (LED) in parallel. Furthermore, as shown in FIG. 15, the inductor $L_P$ is connected to a buffer circuit (D3-R3-C3) including a diode D3 in parallel, a resistor R3 and a capacitor C3. Other components are similar to those in the power device 4 of embodiments of the present invention, and thus the associated descriptions are omitted.

By using the power device 8 according to embodiments of the present invention, the flyback LED illumination device includes an inductor $L_P$ rather than an auxiliary winding inductor, so as to reduce the total weight and volume of the transformer, lower cost and increase efficiency.

(QR DC/DC converter)

Figure 16:
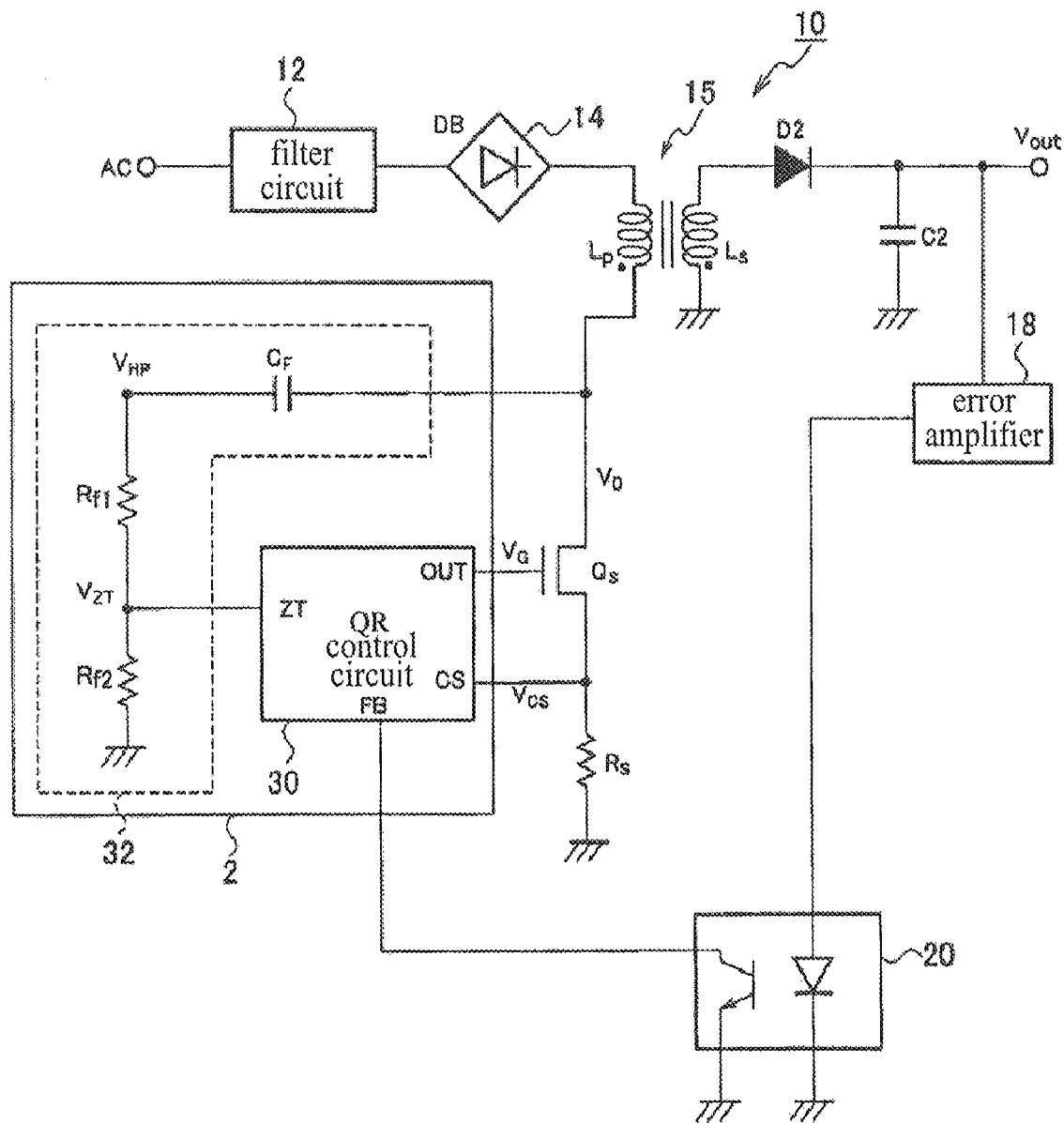
FIG. 16 illustrates a schematic circuit configuration showing a power device in accordance with some embodiments of the present invention, in which a QR type DC/DC converter is illustrated.

FIG. 16 illustrates a schematic circuit configuration of the power device 10 using the power control circuit 2 according to embodiments of the present invention, which is a QR type DC/DC converter.

In FIG. 16, an AC terminal is connected to a diode bridge (DB) 14 and a primary winding $L_P$ of a flyback transformer 15 via a filter circuit 12.

As shown in FIG. 16, the power device 10 according to embodiments of the present invention includes an inductor $L_P$ connected to an AC wire side; a current sensing resistor $R_S$ connected to ground potential; MOSFET Qs connected between the inductor $L_P$ and the current sensing resistor $R_S$ in series; and a power control circuit 2 coupled to the inductor $L_P$, the MOSFET Qs and the current sensing resistor $R_S$ for performing QR control to inductor-current $I_L$ flowing through the inductor $L_P$.

The power control circuit 2 includes a detection circuit 32 for detecting the inductor-current $I_L$ flowing through the inductor $L_P$; and a QR control circuit 30 connected to the detection circuit 32, the MOSFET Qs and the current sensing resistor $R_S$, wherein when the inductor-current $I_L$ of the inductor $L_P$ is conducted in a discharging time sequence, the QR control circuit 30 performs QR control upon the inductor-current $I_L$ of the inductor $L_P$ at a zero crossing point or a bottom point in the discharging time sequence based on an output of the detection circuit 32.

Herein, the detection circuit 32 may include an HPF connected to a drain of the MOSFET Qs connected to the inductor $L_P$.

As shown in FIG. 16, the HPF includes a capacitor $C_F$ connected to a drain of the MOSFET Qs; and a first resistor $R_{f1}$ and a second resistor $R_{f2}$ connected between the capacitor $C_F$ and the ground potential in series; and a regulator terminal ZT of the QR control circuit 30 is connected to the connection point connecting the first resistor $R_{f1}$ and the second resistor $R_{f2}$.

An output OUT is connected to a gate of the MOSFET Qs by the QR control circuit 30 for detecting current connected in the HPF, and, when the inductor-current $I_L$ of the inductor $L_P$ is conducted in a discharging time sequence, controlling the MOSFET Qs to be conductive at a zero cross point or a bottom point in the discharging time sequence based on an output of the detection circuit 32.

The QR control circuit 30 may be used for detecting current conducted in the current sensing resistor $R_S$, and controlling the MOSFET Qs to be non-conductive at a specific reset time point.

A secondary winding $L_s$ of the flyback transformer 15 is connected to a diode rectifying circuit (D2-C2) including a diode D2 and a capacitor C2, and a DC output voltage $V_{out}$ is obtained from an output of the capacitor C2. Further, the DC output voltage $V_{out}$ is fed back to a feedback terminal FB of the QR control circuit 30 at a primary side via an error amplifier 18 and an insulation circuit (photoelectric coupler) 20. As a result, a QR type DC/DC converter is formed by using the power device 10 of the power control circuit 2 according to embodiments of the present invention. Other components are similar to those in the power device 4, and thus the associated descriptions are omitted.

By using the power device 10 according to embodiments of the present invention, the QR type DC/DC converter includes an inductor $L_P$ rather than an auxiliary winding inductor, so as to reduce the total weight and volume of the transformer, lower cost and increase efficiency.

(AC/DC Converter)

Figure 17:
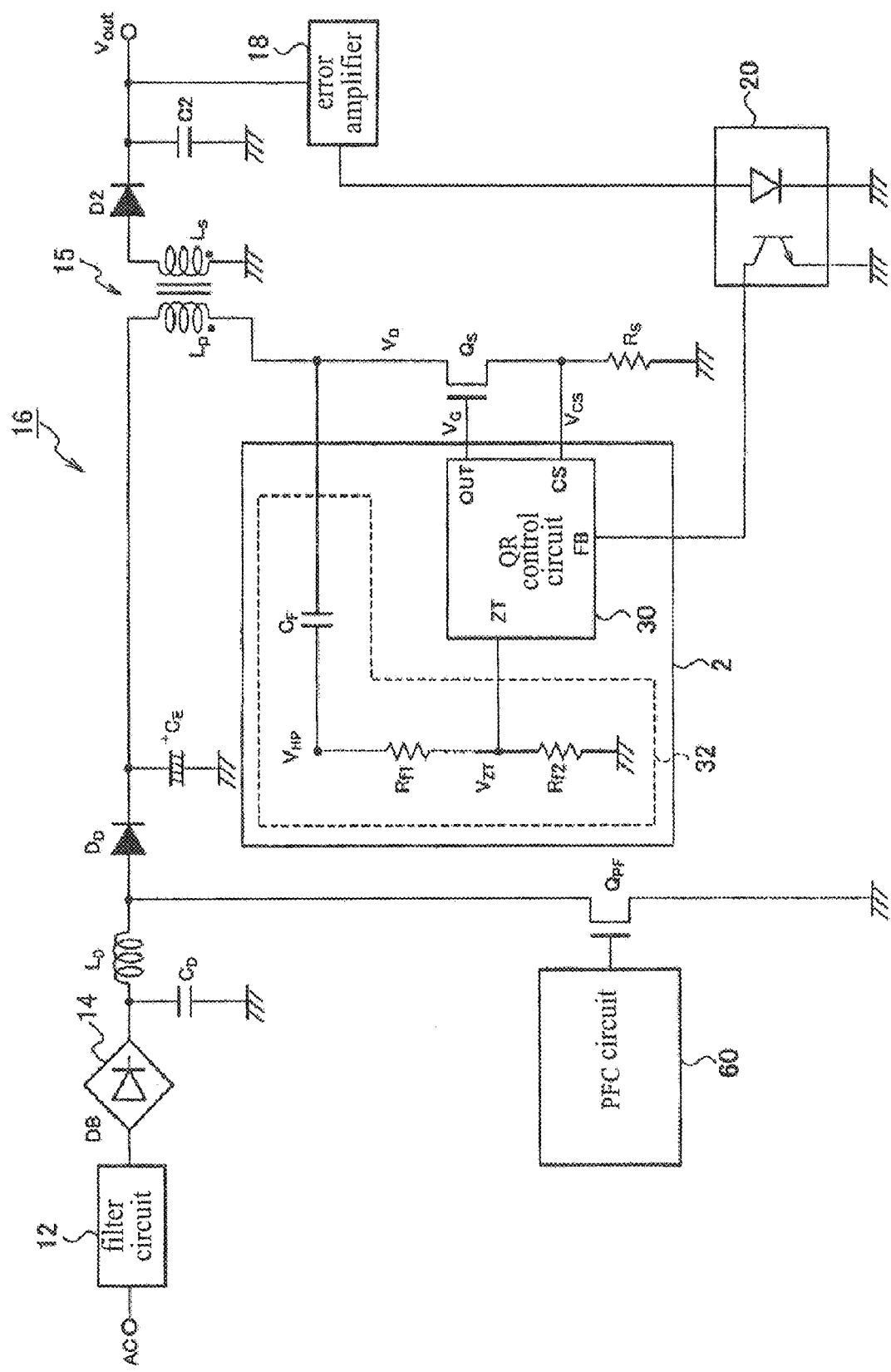
FIG. 17 illustrates a schematic circuit configuration showing a power device in accordance with some embodiments of the present invention, in which an AC/DC converter is illustrated.

FIG. 17 illustrates a schematic circuit configuration of the power device 16 using the power control circuit 2 according to embodiments of the present invention, which is an AC/DC converter. Herein, as shown in FIG. 17, the AC/DC converter includes a power factor correction (PFC) circuit 60.

As shown in FIG. 17, an AC terminal is connected to the primary winding $L_P$ of a flyback transformer 15 via a filter circuit 12, a diode bridge (DB) 14, a smoothing circuit ($C_D$-$L_D$), an anti-reflux diode $D_D$, and an electrolytic capacitor $C_E$.

As shown in FIG. 17, the power device 16 of embodiments of the present invention includes an inductor $L_P$ connected to an AC wire side; a current sensing resistor $R_S$ connected to ground potential; MOSFET Qs connected between the inductor $L_P$ and the current sensing resistor $R_S$ in series; and a power control circuit 2 coupled to the inductor $L_P$, the MOSFET Qs and the current sensing resistor $R_S$ for performing QR control to inductor-current $I_L$ flowing through the inductor $L_P$.

The power control circuit 2 includes a detection circuit 32 for detecting the inductor-current $I_L$ flowing through the inductor $L_P$; and a QR control circuit 30 connected to the detection circuit 32, the MOSFET Qs and the current sensing resistor $R_S$, wherein when the inductor-current $I_L$ of the inductor $L_P$ is conducted in a discharging time sequence, the QR control circuit 30 performs QR control upon the inductor-current $I_L$ of the inductor $L_P$ at a zero crossing point or a bottom point in the discharging time sequence based on an output of the detection circuit 32.

Herein, the detection circuit 32 may include an HPF connected to a drain of the MOSFET Qs connected to the inductor $L_P$.

As shown in FIG. 17, the HPF includes a capacitor $C_F$ connected to a drain of the MOSFET Qs; and a first resistor $R_{f1}$ and a second resistor $R_{f2}$ connected between the capacitor $C_F$ and the ground potential in series; and a regulator terminal ZT of a QR control circuit 30 is connected to a connection point connecting the first resistor $R_{f1}$ and the second resistor $R_{f2}$.

An output OUT is connected to a gate of the MOSFET Qs by the QR control circuit 30 for detecting current conducted in the HPF, and, when the inductor-current $I_L$ of the inductor $L_P$ is conducted in a discharging time sequence, controlling the MOSFET Qs to be conductive at a zero cross point or a bottom point in the discharging time sequence based on an output of the detection circuit 32.

The QR control circuit 30 may be used for detecting current conducted in the current sensing resistor $R_S$, and controlling the MOSFET Qs to be non-conductive at a specific reset time point.

A secondary winding $L_s$ of the flyback transformer 15 is connected to a diode rectifying circuit (D2-C2) including a diode D2 and a capacitor C2, and a DC output voltage $V_{out}$ is obtained from an output of the capacitor C2. Further, the DC output voltage $V_{out}$ is fed back to a feedback terminal FB of the QR control circuit 30 at a primary side via an error amplifier 18 and an insulation circuit (photoelectric coupler) 20.

Further, the PFC circuit 60 may be applied to control the on/off of the MOSFET $Q_{PF}$ to control the connectivity between a connection connecting a primary side of the smoothing circuit ($C_D$-$L_D$) and the anti-reflux diode $D_D$ and the ground potential. As a result, an AC/DC converter capable of performing PFC and QR control is formed by using a power device 16 of the power control circuit 2 according to embodiments of the present invention. In addition, the PFC circuit 60 and the QR control circuit 30 may be implemented as an integrated PFC and QR control circuit to form a single chip. Other components are similar to those in the power device 4 of embodiments of the present invention, and thus the associated descriptions are omitted.

By using the power device 16 according to embodiments of the present invention, the AC/DC converter includes an inductor $L_P$ for PFC and QR control rather than an auxiliary winding inductor, so as to reduce the total weight and volume of the transformer, lower cost and increase efficiency.

(Electronic Equipment)

The power control circuit 2 and the power device (4, 6, 8, 10, 16) using the power control circuit 2 may be installed in electronic equipment. For example, the electronic equipment may be applicable to a smart phone, a notebook PC (personal computer), a tablet computer, a monitor or TV, an external hard disk driver, a set top box, a vacuum, a refrigerator, a washing machine, a telephone, a facsimile machine, a printer, a laser display, communication equipment, a server and etc.

In comparison with PWM control using a fixed frequency mode (PWM fixed frequency control), the applications of the power control circuit 2 and the power device (4, 6, 8, 10, 16) using the power control circuit 2 according to embodiments of the present invention have the advantages of low cost and high efficiency, such as an AC/DC converter an LED illumination device, a DC/DC converter, and etc.

Further, the power control circuit 2 and the power device (4, 6, 8, 10, 16) using the power control circuit 2 according to embodiments of the present invention are formed without an auxiliary winding, so as to reduce the total weight and volume of the transformer.

Hence, according to the present invention, a power control circuit, a power device and electronic equipment using the power control circuit are provided, in which quasi resonance is performed by using a coil in the power control circuit, and current flowing in the coil is monitored by a simple configuration for detecting a zero cross point or a bottom of a resonance.

OTHER EMBODIMENTS

Accordingly, the present invention is illustrated in the embodiments; however, the descriptions and drawings are exemplary illustrations and should not be interpreted to limit the present invention. Persons skilled in the art should understand various substitute embodiments and technology according to the disclosure of the present invention.

Therefore, the present invention includes various embodiments which are not described in this context.

APPLICABILITY IN INDUSTRY

The power control circuit and power device of the present invention are applicable to an AC/DC converter, a DC/DC converter, an LED illumination device, home appliance, mobile equipment and etc.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A power control circuit, comprising:
   a high pass filter, connected to a drain of a MOSFET, wherein the MOSFET is serially connected between an inductor connected to an alternating-current wire and a current sensing resistor connected to a ground potential, and the high pass filter is arranged to generate a filtered output, wherein the filtered output comprises an alternating-current component of a voltage at the drain of the MOSFET; and
   a quasi resonance control circuit, connected to the high pass filter and the MOSFET,
   wherein when an inductor-current of the inductor is conducted in a discharging time sequence, the quasi resonance control circuit performs quasi resonance control upon the inductor-current of the inductor at a zero crossing point or a bottom point in the discharging time sequence based on the filtered output of the high pass filter,
   wherein the high pass filter comprises:
      a capacitor, connected to the drain; and
      a first resistor and a second resistor, connected between the capacitor and the ground potential in series, and
   wherein the quasi resonance control circuit comprises:
      a current detection comparator, an inverting input terminal of the current detection comparator is connected to a connection point connecting the first resistor and the second resistor, and an reference voltage is input to an non-inverting input terminal of the current detection comparator;
      a Zener diode, connected between the inverting input terminal of the current detection comparator and a ground terminal;
      an error amplifier, connected to the current sensing resistor;
      an RS trigger, a setting terminal of the RS trigger is connected to an output of the current detection comparator and a resetting terminal of the RS trigger is connected to an output of the error amplifier, and the RS trigger outputted a control signal of the MOSFET; and
      a buffer, connected to an output of the RS trigger, for driving the MOSFET.

2. The power control circuit of claim 1, wherein an output of the quasi resonance control circuit is connected to a gate of the MOSFET for detecting a current conducted in the high pass filter and for controlling the MOSFET to be conductive at the zero cross point and the bottom point.

3. The power control circuit of claim 2, wherein the quasi resonance control circuit is used for detecting a current conducted in the current sensing resistor, and for controlling the MOSFET to be non-conductive at a specific reset time point.

4. The power control circuit of claim 1, wherein the high pass filter comprises:
   a capacitor, connected to the drain; and
   a first resistor and a second resistor, connected between the capacitor and the ground potential in series, in which the quasi resonance control circuit is connected to a connection point connecting the first resistor and the second resistor.

5. The power control circuit according to claim 4, wherein the quasi resonance control circuit comprises:
   a current detection comparator, connected to the connection point;
   an error amplifier, connected to the current sensing resistor;
   an RS trigger, connected to an output of the current detection comparator and an output of the error amplifier, and outputted a control signal of the MOSFET; and
   a buffer, connected to an output of the RS trigger, for driving the MOSFET.

6. The power control circuit of claim 5, wherein the MOSFET is controlled to be conductive at a time point at which the RS trigger performs a setting action, and the MOSFET is controlled to be non-conductive at a time point at which the RS trigger performs a resetting action.

7. A power device, comprising:
   an inductor, connected to an alternating-current wire;
   a current sensing resistor, connected to a ground potential;
   a MOSFET, connected between the inductor and the current sensing resistor in series;
   a high pass filter, connected to a drain of the MOSFET, wherein the high pass filter is arranged to generate a filtered output, wherein the filtered output comprises an alternating-current component of a voltage at the drain of the MOSFET; and
   a quasi resonance control circuit, connected to the high pass filter and the MOSFET, wherein when an inductor-current of the inductor is conducted in a discharging time sequence, the quasi resonance control circuit performs quasi resonance control upon the inductor-current of the inductor at a zero crossing point or a bottom point in the discharging time sequence based on the filtered output of the high pass filter, wherein the high pass filter comprises:
a capacitor, connected to the drain; and
a first resistor and a second resistor, connected between the capacitor and the ground potential in series, and
wherein the quasi resonance control circuit comprises:
a current detection comparator, an inverting input terminal of the current detection comparator is connected to a connection point connecting the first resistor and the second resistor, and an reference voltage is input to an non-inverting input terminal of the current detection comparator;
a Zener diode, connected between the inverting input terminal of the current detection comparator and a ground terminal;
an error amplifier, connected to the current sensing resistor;
an RS trigger, a setting terminal of the RS trigger is connected to an output of the current detection comparator and a resetting terminal of the RS trigger is connected to an output of the error amplifier, and the RS trigger outputted a control signal of the MOSFET; and
a buffer, connected to an output of the RS trigger, for driving the MOSFET.

8. The power device of claim 7, wherein an output of the quasi resonance control circuit is connected to a gate of the MOSFET for detecting current conducted in the high pass filter, and for controlling the MOSFET to be conductive at the zero cross point and the bottom point.

9. The power device of claim 8, wherein the quasi resonance control circuit is used for detecting a current conducted in the current sensing resistor, and for controlling the MOSFET to be non-conductive at a specific reset time point.

10. The power device of claim 7, wherein the high pass filter comprises:
a capacitor, connected to the drain; and
a first resistor and a second resistor, connected between the capacitor and the ground potential in series, in which the quasi resonance control circuit is connected to a connection point connecting the first resistor and the second resistor.

11. The power device of claim 10, wherein the quasi resonance control circuit comprises:
a current detection comparator, connected to the connection point;
an error amplifier, connected to the current sensing resistor;
an RS trigger, connected to an output of the current detection comparator and an output of the error amplifier, and outputted a control signal of the MOSFET; and
a buffer, connected to an output of the RS trigger, for driving the MOSFET.

12. The power device of claim 11, wherein the MOSFET is controlled to be conductive at a time point at which the RS trigger performs a setting action, and the MOSFET is controlled to be non-conductive at a time point at which the RS trigger performs a resetting action.

13. The power device of claim 7, wherein the power device is one of a buck LED illumination device, a boost LED illumination device and a flyback LED illumination device.

14. The power device of claim 7, wherein the power device is a quasi resonant DC/DC converter.

15. The power device of claim 7, wherein the power device is an AC/DC converter.

16. The power device of claim 15, wherein the AC/DC converter comprises a power factor correction circuit.

17. An electronic equipment, comprising the power device of claim 7.

18. The electronic equipment of claim 17, wherein the electronic equipment is one of a monitor, an external hard disk driver, a set top box, a notebook PC, a tablet PC, a smart phone, a battery charging system, a personal calculator, a display, a printer, a vacuum, a refrigerator, a facsimile machine, a telephone, communication equipment and a server.

19. A power control circuit, comprising:
a high pass filter, connected to a drain of a MOSFET, wherein the MOSFET is serially connected between an inductor connected to an alternating-current wire and a current sensing resistor connected to a ground potential, and the high pass filter is arranged to generate a filtered output, wherein the filtered output comprises an alternating-current component of a voltage at the drain of the MOSFET; and
a quasi resonance control circuit, connected to the high pass filter and the MOSFET, wherein when an inductor-current of the inductor is conducted in a discharging time sequence, the quasi resonance control circuit performs quasi resonance control upon the inductor-current of the inductor at a zero crossing point or a bottom point in the discharging time sequence based on the filtered output of the high pass filter, wherein the zero crossing point or the bottom point is determined by the filtered output of the high pass filter, wherein the high pass filter comprises:
a capacitor, connected to the drain; and
a first resistor and a second resistor, connected between the capacitor and the ground potential in series, and
wherein the quasi resonance control circuit comprises:
a current detection comparator, an inverting input terminal of the current detection comparator is connected to a connection point connecting the first resistor and the second resistor, and an reference voltage is input to an non-inverting input terminal of the current detection comparator;
a Zener diode, connected between the inverting input terminal of the current detection comparator and a ground terminal;
an error amplifier, connected to the current sensing resistor;
an RS trigger, a setting terminal of the RS trigger is connected to an output of the current detection comparator and a resetting terminal of the RS trigger is connected to an output of the error amplifier, and the RS trigger outputted a control signal of the MOSFET; and
a buffer, connected to an output of the RS trigger, for driving the MOSFET.

20. The power control circuit of claim 19, wherein an output of the quasi resonance control circuit is connected to a gate of the MOSFET for detecting a current conducted in the high pass filter and for controlling the MOSFET to be conductive at the zero cross point and the bottom point.

21. The power control circuit of claim 20, wherein the quasi resonance control circuit is used for detecting a current conducted in the current sensing resistor, and for controlling the MOSFET to be non-conductive at a specific reset time point.

22. The power control circuit of claim 19, wherein the high pass filter comprises:
   a capacitor, connected to the drain; and
   a first resistor and a second resistor, connected between the capacitor and the ground potential in series, in which the quasi resonance control circuit is connected to a connection point connecting the first resistor and the second resistor.

23. The power control circuit according to claim 22, wherein the quasi resonance control circuit comprises:
   a current detection comparator, connected to the connection point;
   an error amplifier, connected to the current sensing resistor;
   an RS trigger, connected to an output of the current detection comparator and an output of the error amplifier, and outputted a control signal of the MOSFET; and
   a buffer, connected to an output of the RS trigger, for driving the MOSFET.

24. The power control circuit of claim 23, wherein the MOSFET is controlled to be conductive at a time point at which the RS trigger performs a setting action, and the MOSFET is controlled to be non-conductive at a time point at which the RS trigger performs a resetting action.

* * * * *